United States Patent
Natarajan et al.

(10) Patent No.: US 12,408,142 B2
(45) Date of Patent: Sep. 2, 2025

(54) UE ASSISTED PAGING ENHANCEMENTS FOR MULTI-USIM DEVICES

(71) Applicant: NOKIA TECHNOLOGIES OY, Espoo (FI)

(72) Inventors: Rajesh Babu Natarajan, Bangalore (IN); Srikanta Sahu, Bangalore (IN); Prasna Kumar Sahu, Bangalore (IN); Devaki Chandramouli, Plano, TX (US)

(73) Assignee: NOKIA TECHNOLOGIES OY, Espoo (FI)

( * ) Notice: Subject to any disclaimer, the term of this patent is extended or adjusted under 35 U.S.C. 154(b) by 381 days.

(21) Appl. No.: 17/995,824

(22) PCT Filed: Mar. 25, 2021

(86) PCT No.: PCT/EP2021/057659
§ 371 (c)(1),
(2) Date: Oct. 7, 2022

(87) PCT Pub. No.: WO2021/204548
PCT Pub. Date: Oct. 14, 2021

(65) Prior Publication Data
US 2023/0156660 A1    May 18, 2023

(30) Foreign Application Priority Data
Apr. 8, 2020   (IN) .............................. 202041015450

(51) Int. Cl.
*H04W 68/02* (2009.01)
*H04W 60/04* (2009.01)
*H04W 76/28* (2018.01)

(52) U.S. Cl.
CPC ........... *H04W 68/02* (2013.01); *H04W 60/04* (2013.01); *H04W 76/28* (2018.02)

(58) Field of Classification Search
None
See application file for complete search history.

(56) References Cited

U.S. PATENT DOCUMENTS

| 2017/0280473 A1 | 9/2017 | Krishnamoorthy et al. |
| 2018/0263012 A1* | 9/2018 | Ryu ..................... H04W 68/02 |

(Continued)

FOREIGN PATENT DOCUMENTS

| EP | 3 742 831 A1 | 11/2020 |
| WO | WO 2020/247043 A1 | 12/2020 |

OTHER PUBLICATIONS

"3rd Generation Partnership Project; Technical Specification Group Core Network and Terminals; Non-Access-Stratum (NAS) Protocol for 5G Systems (5GS); Stage 3; (Release 15)", 3GPP TS 24.501 v16.3.0 (Dec. 20, 2019), 645 pages.

(Continued)

*Primary Examiner* — Kouroush Mohebbi
(74) *Attorney, Agent, or Firm* — Lippes Mathias LLP

(57) ABSTRACT

An apparatus in a communications device supporting a plurality of different identities, the apparatus comprising at least one processor and at least one memory including computer program code, the at least one memory and computer program code configured to, with the at least one processor, cause the apparatus at least to: determine at least one paging overlap occasion for networks associated with the different identities; communicate the at least one paging overlap occasion determination to one of the networks associated with one of the different identities within a registration request to the one of the networks, wherein the one of the networks is caused to schedule at least one paging message to the apparatus based on the at least one paging overlap occasion determination such that the at least one paging message is scheduled at a time other than the at least one paging overlap occasion determination; and control a (Continued)

reception of the at least one paging message for the one of the networks such that the apparatus is caused not to listen for a paging message for the one of the networks during the determined at least one paging overlap occasion and control a reception of at least one paging message for a further one of the networks associated with the different identities during the determined at least one paging overlap occasion.

15 Claims, 11 Drawing Sheets

(56) References Cited

U.S. PATENT DOCUMENTS

| | | | |
|---|---|---|---|
| 2019/0124572 A1 | 4/2019 | Park et al. | |
| 2020/0053830 A1* | 2/2020 | Venkataraman | H04W 76/27 |
| 2022/0159616 A1* | 5/2022 | Stojanovski | H04W 68/02 |
| 2023/0045765 A1* | 2/2023 | Youn | H04W 60/005 |

OTHER PUBLICATIONS

"3rd Generation Partnership Project; Technical Specification Group Radio Access Network; Evolved Universal Terrestrial Radio Access (E-UTRA); User Equipment (UE) procedures in idle mode (Release 15)", 3GPP TS 36.304 v15.5.0, (Dec. 2019), 55 pages.

"3rd Generation Partnership Project; Technical Specification Group Radio Access Network; NG-RAN; NG Application Protocol (NGAP) (Release 16)", 3GPP TS 38.413 v16.0.0, (Dec. 2019), 335 pages.

"3rd Generation Partnership Project; Technical Specification Group Radio Access Network; NR; NR and NG-RAN Overall Description; Stage 2 (Release 16)", 3GPP TS 38.300 v16.0.0, (Dec. 2019), 101 pages.

"3rd Generation Partnership Project; Technical Specification Group Radio Access Network; NR; Radio Resource Control (RRC) protocol specification (Release 15)", 3GPP TS 38.331 v15.9.0, (Mar. 2020), 536 pages.

"3rd Generation Partnership Project; Technical Specification Group Radio Access Network; NR; User Equipment (UE) procedures in Idle mode and RRC Inactive state (Release 15)", 3GPP TS 38.304 v15.6.0, (Dec. 2019), 30 pages.

"3rd Generation Partnership Project; Technical Specification Group Services and System Aspects; Procedures for the 5G System (5GS); Stage 2 (Release 16)", 3GPP TS 23.502 v16.4.0, (Mar. 2020), 582 pages.

"3rd Generation Partnership Project; Technical Specification Group Services and System Aspects; Study on system enablers for devices having multiple Universal Subscriber Identity Modules (USIM) (Release 17)", 3GPP TR 23.761 v0.3.0, (Jan. 2020), 37 pages.

"3rd Generation Partnership Project; Technical Specification Group Services and System Aspects; System architecture for the 5G System (5GS); Stage 2 (Release 16)", 3GPP TS 23.501 v16.4.0, (Mar. 2020), 430 pages.

First Examination Report for Indian Application No. 202041015450 dated Nov. 30, 2021, 7 pages.

International Search Report and Written Opinion for Patent Cooperation Treaty Application No. PCT/EP2021/057659 dated Jun. 23, 2021, 14 pages.

* cited by examiner

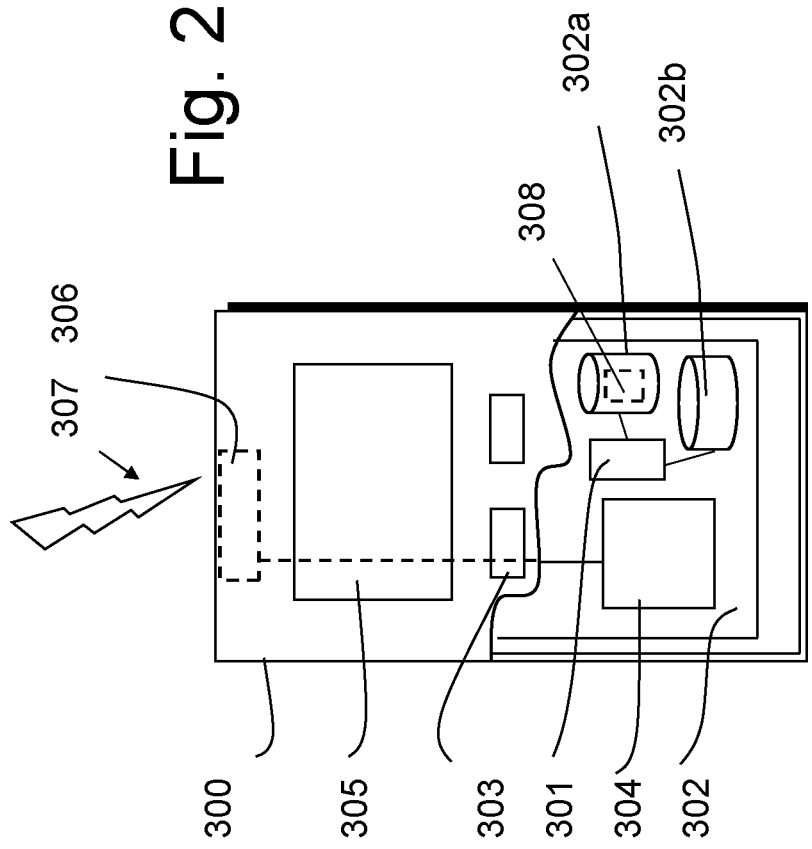

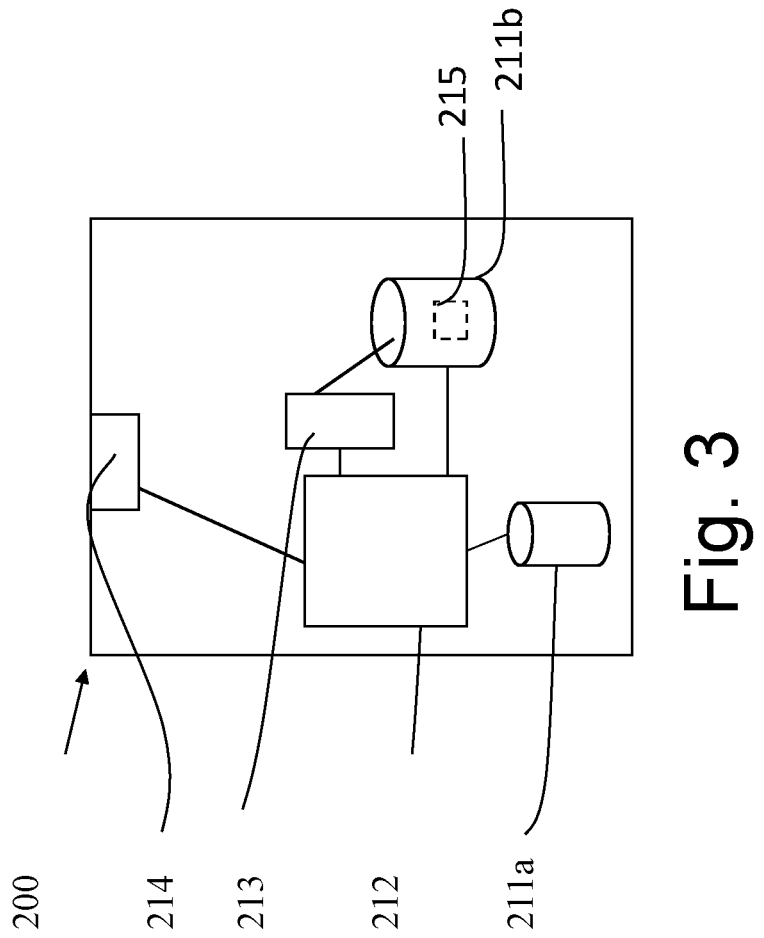

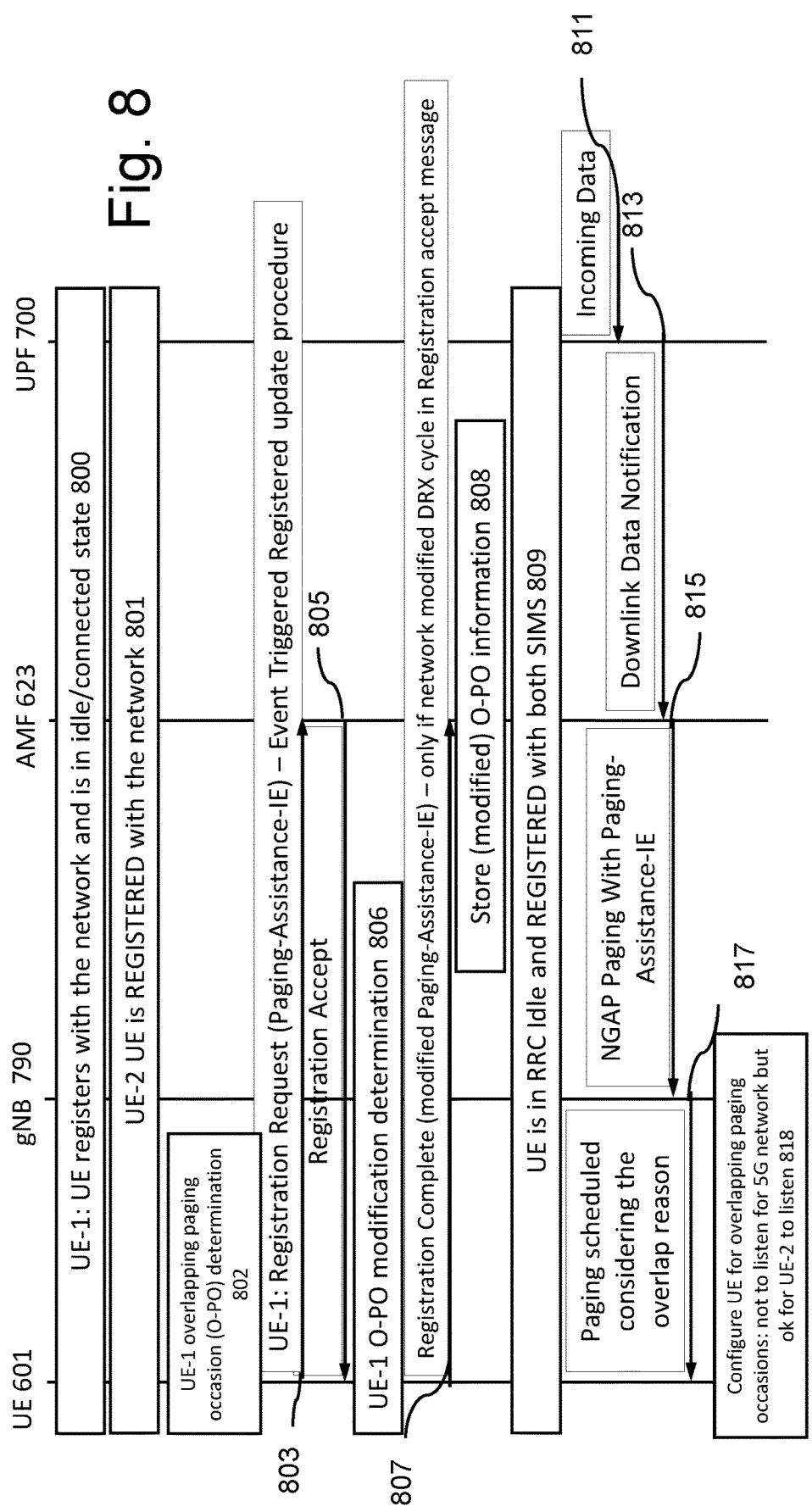

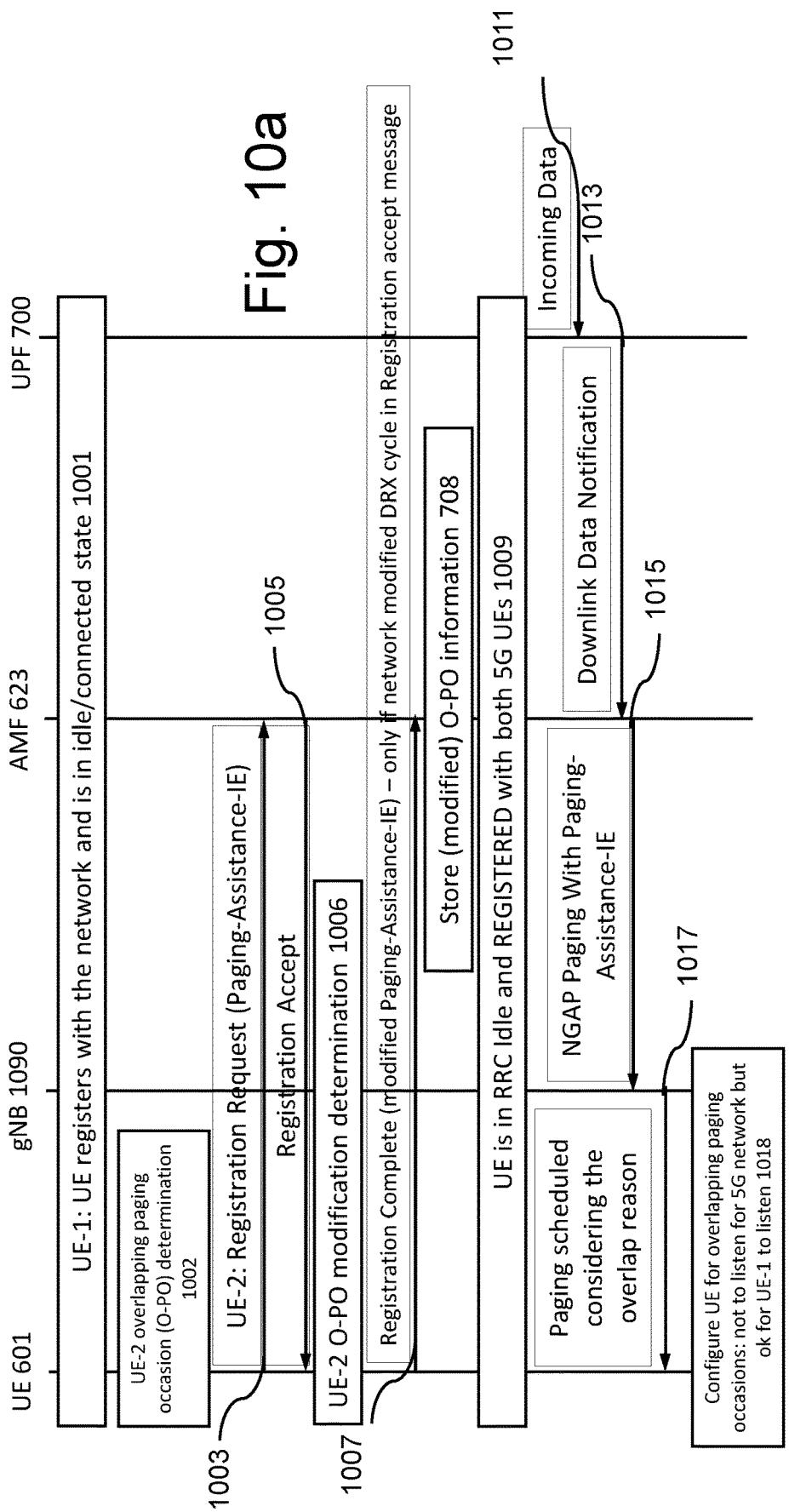

UE ASSISTED PAGING ENHANCEMENTS FOR MULTI-USIM DEVICES

CROSS-REFERENCE TO RELATED APPLICATIONS

This application is a national phase entry of International Application No. PCT/EP2021/057659, filed Mar. 25, 2021, which claims priority to Indian Application No. 202041015450, filed Apr. 8, 2020, the contents of which are hereby incorporated by reference in their entirety.

FIELD OF THE DISCLOSURE

The present disclosure relates to an apparatus, a method, and a computer program and in particular but not exclusively for apparatus, methods and computer programs for use where a communication device is associated with a plurality of identities.

BACKGROUND

A communication system can be seen as a facility that enables communication sessions between two or more entities such as communication devices, base stations/access points and/or other nodes by providing carriers between the various entities involved in the communications path. A communication system can be provided for example by means of a communication network and one or more compatible communications devices.

Access to the communication system may be via an appropriate communications device or terminal. A communications device is provided with an appropriate signal receiving and transmitting apparatus for enabling communications, for example enabling access to a communication network or communications directly with other communications device. The communications device may access a carrier provided by a station or access point, and transmit and/or receive communications on the carrier.

The communication system and associated devices typically operate in accordance with a given standard or specification which sets out what the various entities associated with the system are permitted to do and how that should be achieved.

SUMMARY

According to an aspect, there is provided an apparatus in a communications device supporting a plurality of different identities, the apparatus comprising at least one processor and at least one memory including computer program code, the at least one memory and computer program code configured to, with the at least one processor, cause the apparatus at least to: determine at least one paging overlap occasion for networks associated with the different identities; communicate the at least one paging overlap occasion determination to one of the networks associated with one of the different identities within a registration request to the one of the networks, wherein the one of the networks is caused to schedule at least one paging message to the apparatus based on the at least one paging overlap occasion determination such that the at least one paging message is scheduled at a time other than the at least one paging overlap occasion determination; and control a reception of the at least one paging message for the one of the networks such that the apparatus is caused not to listen for a paging message for the one of the networks during the determined at least one paging overlap occasion and control a reception of at least one paging message for a further one of the networks associated with the different identities during the determined at least one paging overlap occasion.

The at least one memory and computer program code may be configured to, with the at least one processor, cause the apparatus at least to: determine a modification of the at least one paging overlap occasion for the different identities based on information received in an acceptance of the registration request; communicate the modification of the at least one paging overlap occasion to the one of the networks associated with the different identities within a registration complete message to the one of the networks, wherein the one of the networks is caused to schedule at least one paging message to the apparatus based on the modified at least one paging overlap occasion such that the at least one paging message is scheduled at a time other than the at least one modified paging overlap occasion; and wherein the apparatus caused to control a reception of the at least one paging message for the one of the networks such that the apparatus is caused not to listen for a paging message for the one of the networks during the determined at least one paging overlap occasion and control a reception of at least one paging message for a further from the networks associated with the different identities during the determined at least one paging overlap occasion is caused to control a reception of the at least one paging message for the one of the networks such that the apparatus is caused not to listen for a paging message for the one of the networks during the modified at least one paging overlap occasion and control a reception of at least one paging message for a further from the networks associated with the different identities during the modified at least one paging overlap occasion.

The at least one memory and computer program code may be configured to, with the at least one processor, cause the apparatus at least to control a registration or attach procedure to the one of the networks, wherein the apparatus is caused to indicate or negotiate a different discontinuous receive cycle value for the one of the networks compared to the discontinuous receive cycle value for the another of the networks.

The apparatus, caused to communicate the at least one paging overlap occasion determination to one of the networks associated with the different identities within a registration request to the one of the networks may be further caused to communicate the at least one paging overlap occasion determination to one of the networks within at least one paging assistance information element.

The at least one paging assistance information element may comprise at least one of: a definition of overlapping paging frames; a system frame number from which the paging overlap window starts; a paging overlap index identifying a first slot/symbol of the paging overlap; and a paging overlap length identifying a number of consecutive slot/symbols of the paging overlap.

The one or more of the identities may comprise one or more of: a universal subscriber identity module identity; an electronic subscriber identity module identity; and a subscriber identity module identity.

The one of the networks may be one of the same or different to the another of the networks.

According to a second aspect there is provided an apparatus comprising at least one processor and at least one memory including a computer program code, the at least one memory and computer program code configured to, with the at least one processor, cause the apparatus at least to: receive, from a further apparatus supporting a plurality of different identities associated a plurality of networks, information within a registration request detailing at least one paging overlap occasion for one of the networks and another of networks associated with the different identities; and control the scheduling of at least one paging message to the further apparatus for the one of the networks based on the at least one paging overlap occasion such that the at least one paging message for the one of the networks is scheduled at a time other than the at least one paging overlap occasion determination.

The at least one memory and computer program code may be configured to, with the at least one processor, cause the apparatus at least to, in response to the information within a registration request detailing at least one paging overlap occasion: modify a discontinuous reception cycle value/paging related parameter for the one of the networks, received within the registration request; and communicate the modified discontinuous reception cycle value/paging related parameter for the one of the networks to the further apparatus within a registration accept message for the one of the networks.

The at least one memory and computer program code may be configured to, with the at least one processor, cause the apparatus at least to: receive, within a registration complete message, a modification of the at least one paging overlap occasion for the one of the networks and the another of networks associated with the different identities; and control the scheduling of at least one paging message to the further apparatus for the one of the networks based on the modification of the at least one paging overlap occasion such that the at least one paging message for the one of the networks is scheduled at a time other than the modified at least one paging overlap occasion.

The apparatus caused to control the scheduling of at least one paging message for the one of the networks to the further apparatus based on the modification of the at least one paging overlap occasion may be caused to communicate the scheduling of at least one paging message for the one of the networks to the further apparatus based on the modification of the at least one paging overlap occasion within a message to a radio access network node for the network.

The apparatus caused to communicate the scheduling of at least one paging message for the one of the networks to the further apparatus based on the modification of the at least one paging overlap occasion within a message to a radio access network node for the network may be caused to perform at least one of: communicate the scheduling of at least one paging message for the one of the networks to the further apparatus within a next generation application protocol paging message to the radio access network node; and communicate the scheduling of at least one paging message for the one of the networks to the further apparatus within a modified context message to the radio access network node.

The modified context message may be a modified UE context message.

The apparatus caused to control the scheduling of at least one paging message for the one of the networks to the further apparatus based on the at least one paging overlap occasion may be caused to control the scheduling of at least one paging message for the one of the networks to the further apparatus based on the at least one paging overlap occasion when the one of the networks is a 5G network.

The apparatus caused to control the scheduling of at least one paging message for the one of the networks to the further apparatus based on the at least one paging overlap occasion may be caused to communicate the scheduling of at least one paging message for the one of the networks to the further apparatus based on the at least one paging overlap occasion within a message to a radio access network node for the network.

The apparatus caused to communicate the scheduling of at least one paging message for the one of the networks to the further apparatus based on the at least one paging overlap occasion within a message to a radio access network node for the network may be caused to perform at least one of: communicate the scheduling of at least one paging message for the one of the networks to the further apparatus within a next generation application protocol paging message to the radio access network node; and communicate the scheduling of at least one paging message for the one of the networks to the further apparatus within an initial context setup message to the radio access network node.

The apparatus caused to receive information within a registration request detailing at least one paging overlap occasion for one of the networks and another of networks associated with the different identities may be caused to receive the at least one paging overlap occasion determination to one of the networks within at least one paging assistance information element.

The at least one paging assistance information element may comprise at least one of:
a definition of overlapping paging frames; a system frame number from which the paging overlap window starts; a paging overlap index identifying a first slot/symbol of the paging overlap; and a paging overlap length identifying a number of consecutive slot/symbols of the paging overlap.

The one or more of the identities may comprise one or more of: a universal subscriber identity module identity; an electronic subscriber identity module identity; and a subscriber identity module identity.

The one of the networks may be one of the same or different to the another of the networks.

According to a third aspect there is provided a method for an apparatus in a communications device supporting a plurality of different identities, the method comprising: determining at least one paging overlap occasion for networks associated with the different identities; communicating the at least one paging overlap occasion determination to one of the networks associated with one of the different identities within a registration request to the one of the networks, wherein the one of the networks is caused to schedule at least one paging message to the apparatus based on the at least one paging overlap occasion determination such that the at least one paging message is scheduled at a time other than the at least one paging overlap occasion determination; and controlling a reception of the at least one paging message for the one of the networks such that the apparatus is caused not to listen for a paging message for the one of the networks during the determined at least one paging overlap occasion and control a reception of at least one paging message for a further one of the networks associated with the different identities during the determined at least one paging overlap occasion.

The method may further comprise: determining a modification of the at least one paging overlap occasion for the different identities based on information received in an acceptance of the registration request; communicating the modification of the at least one paging overlap occasion to the one of the networks associated with the different identities within a registration complete message to the one of the networks, wherein the one of the networks is caused to schedule at least one paging message to the apparatus based on the modified at least one paging overlap occasion such that the at least one paging message is scheduled at a time other than the at least one modified paging overlap occasion; and wherein controlling a reception of the at least one paging message for the one of the networks such that the apparatus is caused not to listen for a paging message for the one of the networks during the determined at least one paging overlap occasion and control a reception of at least one paging message for a further from the networks associated with the different identities during the determined at least one paging overlap occasion comprises controlling a reception of the at least one paging message for the one of the networks such that the apparatus is caused not to listen for a paging message for the one of the networks during the modified at least one paging overlap occasion and controlling a reception of at least one paging message for a further from the networks associated with the different identities during the modified at least one paging overlap occasion.

The method may further comprise: controlling a registration or attach procedure to the one of the networks; and indicating or negotiating a different discontinuous receive cycle value for the one of the networks compared to the discontinuous receive cycle value for the another of the networks.

Communicating the at least one paging overlap occasion determination to one of the networks associated with the different identities within a registration request to the one of the networks may further comprise communicating the at least one paging overlap occasion determination to one of the networks within at least one paging assistance information element.

The at least one paging assistance information element may comprise at least one of: a definition of overlapping paging frames; a system frame number from which the paging overlap window starts; a paging overlap index identifying a first slot/symbol of the paging overlap; and a paging overlap length identifying a number of consecutive slot/symbols of the paging overlap.

The one or more of the identities may comprise one or more of: a universal subscriber identity module identity; an electronic subscriber identity module identity; and a subscriber identity module identity.

The one of the networks may be one of the same or different to the another of the networks.

According to a fourth aspect there is provided a method for an apparatus within a communications system, the method comprising: receiving, from a further apparatus supporting a plurality of different identities associated a plurality of networks, information within a registration request detailing at least one paging overlap occasion for one of the networks and another of networks associated with the different identities; and controlling the scheduling of at least one paging message to the further apparatus for the one of the networks based on the at least one paging overlap occasion such that the at least one paging message for the one of the networks is scheduled at a time other than the at least one paging overlap occasion determination.

The method may comprise, in response to the information within a registration request detailing at least one paging overlap occasion: modifying a discontinuous reception cycle value/paging related parameter for the one of the networks, received within the registration request; and communicating the modified discontinuous reception cycle value/paging related parameter for the one of the networks to the further apparatus within a registration accept message for the one of the networks.

The method may further comprise: receiving, within a registration complete message, a modification of the at least one paging overlap occasion for the one of the networks and the another of networks associated with the different identities; and controlling the scheduling of at least one paging message to the further apparatus for the one of the networks based on the modification of the at least one paging overlap occasion such that the at least one paging message for the one of the networks is scheduled at a time other than the modified at least one paging overlap occasion.

Controlling the scheduling of at least one paging message for the one of the networks to the further apparatus based on the modification of the at least one paging overlap occasion may comprise communicating the scheduling of at least one paging message for the one of the networks to the further apparatus based on the modification of the at least one paging overlap occasion within a message to a radio access network node for the network.

Communicating the scheduling of at least one paging message for the one of the networks to the further apparatus based on the modification of the at least one paging overlap occasion within a message to a radio access network node for the network may comprise at least one of: communicating the scheduling of at least one paging message for the one of the networks to the further apparatus within a new generation application protocol paging message to the radio access network node; and communicating the scheduling of at least one paging message for the one of the networks to the further apparatus within a modified context message to the radio access network node.

The modified context message may be a modified UE context message.

Controlling the scheduling of at least one paging message for the one of the networks to the further apparatus based on the at least one paging overlap occasion may comprise controlling the scheduling of at least one paging message for the one of the networks to the further apparatus based on the at least one paging overlap occasion when the one of the networks is a 5G network.

Controlling the scheduling of at least one paging message for the one of the networks to the further apparatus based on the at least one paging overlap occasion may comprise communicating the scheduling of at least one paging message for the one of the networks to the further apparatus based on the at least one paging overlap occasion within a message to a radio access network node for the network.

Communicating the scheduling of at least one paging message for the one of the networks to the further apparatus based on the at least one paging overlap occasion within a message to a radio access network node for the network may comprise at least one of: communicating the scheduling of at least one paging message for the one of the networks to the further apparatus within a next generation application protocol paging message to the radio access network node; and communicating the scheduling of at least one paging message for the one of the networks to the further apparatus within an initial context setup message to the radio access network node.

Receiving information within a registration request detailing at least one paging overlap occasion for one of the networks and another of networks associated with the different identities may comprise receiving the at least one paging overlap occasion determination to one of the networks within at least one paging assistance information element.

The at least one paging assistance information element may comprise at least one of:
a definition of overlapping paging frames; a system frame number from which the paging overlap window starts; a paging overlap index identifying a first slot/symbol of the paging overlap; and a paging overlap length identifying a number of consecutive slot/symbols of the paging overlap.

The one or more of the identities may comprise one or more of: a universal subscriber identity module identity; an electronic subscriber identity module identity; and a subscriber identity module identity.

The one of the networks may be one of the same or different to the another of the networks.

According to a fifth aspect, there is provided an apparatus comprising means configured to: determine at least one paging overlap occasion for networks associated with the different identities; communicate the at least one paging overlap occasion determination to one of the networks associated with one of the different identities within a registration request to the one of the networks, wherein the one of the networks is caused to schedule at least one paging message to the apparatus based on the at least one paging overlap occasion determination such that the at least one paging message is scheduled at a time other than the at least one paging overlap occasion determination; and control a reception of the at least one paging message for the one of the networks such that the apparatus is caused not to listen for a paging message for the one of the networks during the determined at least one paging overlap occasion and control a reception of at least one paging message for a further one of the networks associated with the different identities during the determined at least one paging overlap occasion.

The means may be further configured to: determine a modification of the at least one paging overlap occasion for the different identities based on information received in an acceptance of the registration request; communicate the modification of the at least one paging overlap occasion to the one of the networks associated with the different identities within a registration complete message to the one of the networks, wherein the one of the networks is caused to schedule at least one paging message to the apparatus based on the modified at least one paging overlap occasion such that the at least one paging message is scheduled at a time other than the at least one modified paging overlap occasion; and wherein the means configured to control a reception of the at least one paging message for the one of the networks such that the apparatus is caused not to listen for a paging message for the one of the networks during the determined at least one paging overlap occasion and control a reception of at least one paging message for a further from the networks associated with the different identities during the determined at least one paging overlap occasion is configured to control a reception of the at least one paging message for the one of the networks such that the apparatus is caused not to listen for a paging message for the one of the networks during the modified at least one paging overlap occasion and control a reception of at least one paging message for a further from the networks associated with the different identities during the modified at least one paging overlap occasion.

The means may be caused to control a registration or attach procedure to the one of the networks, wherein the apparatus is caused to indicate or negotiate a different discontinuous receive cycle value for the one of the networks compared to the discontinuous receive cycle value for the another of the networks.

The means configured to communicate the at least one paging overlap occasion determination to one of the networks associated with the different identities within a registration request to the one of the networks may be further configured to communicate the at least one paging overlap occasion determination to one of the networks within at least one paging assistance information element.

The at least one paging assistance information element may comprise at least one of: a definition of overlapping paging frames; a system frame number from which the paging overlap window starts; a paging overlap index identifying a first slot/symbol of the paging overlap; and a paging overlap length identifying a number of consecutive slot/symbols of the paging overlap.

The one or more of the identities may comprise one or more of: a universal subscriber identity module identity; an electronic subscriber identity module identity; and a subscriber identity module identity.

The one of the networks may be one of the same or different to the another of the networks.

According to a sixth aspect there is provided an apparatus comprising means configured to: receive, from a further apparatus supporting a plurality of different identities associated a plurality of networks, information within a registration request detailing at least one paging overlap occasion for one of the networks and another of networks associated with the different identities; and control the scheduling of at least one paging message to the further apparatus for the one of the networks based on the at least one paging overlap occasion such that the at least one paging message for the one of the networks is scheduled at a time other than the at least one paging overlap occasion determination.

The means may be configured to, in response to the information within a registration request detailing at least one paging overlap occasion: modify a discontinuous reception cycle value/paging related parameter for the one of the networks, received within the registration request; and communicate the modified discontinuous reception cycle value/paging related parameter for the one of the networks to the further apparatus within a registration accept message for the one of the networks.

The means may be configured to: receive, within a registration complete message, a modification of the at least one paging overlap occasion for the one of the networks and the another of networks associated with the different identities; and control the scheduling of at least one paging message to the further apparatus for the one of the networks based on the modification of the at least one paging overlap occasion such that the at least one paging message for the one of the networks is scheduled at a time other than the modified at least one paging overlap occasion.

The means configured to control the scheduling of at least one paging message for the one of the networks to the further apparatus based on the modification of the at least one paging overlap occasion may be configured to communicate the scheduling of at least one paging message for the one of the networks to the further apparatus based on the modification of the at least one paging overlap occasion within a message to a radio access network node for the network.

The means configured to communicate the scheduling of at least one paging message for the one of the networks to the further apparatus based on the modification of the at least one paging overlap occasion within a message to a radio access network node for the network may be configured to perform at least one of: communicate the scheduling of at least one paging message for the one of the networks to the further apparatus within a next generation application protocol paging message to the radio access network node; and communicate the scheduling of at least one paging message for the one of the networks to the further apparatus within a modified context message to the radio access network node.

The modified context message may be a modified UE context message.

The means configured to control the scheduling of at least one paging message for the one of the networks to the further apparatus based on the at least one paging overlap occasion may be configured to control the scheduling of at least one paging message for the one of the networks to the further apparatus based on the at least one paging overlap occasion when the one of the networks is a 5G network.

The means configured to control the scheduling of at least one paging message for the one of the networks to the further apparatus based on the at least one paging overlap occasion may be configured to communicate the scheduling of at least one paging message for the one of the networks to the further apparatus based on the at least one paging overlap occasion within a message to a radio access network node for the network.

The means configured to communicate the scheduling of at least one paging message for the one of the networks to the further apparatus based on the at least one paging overlap occasion within a message to a radio access network node for the network may be configured to perform at least one of: communicate the scheduling of at least one paging message for the one of the networks to the further apparatus within a next generation application protocol paging message to the radio access network node; and communicate the scheduling of at least one paging message for the one of the networks to the further apparatus within an initial context setup message to the radio access network node.

The means configured to receive information within a registration request detailing at least one paging overlap occasion for one of the networks and another of networks associated with the different identities may be configured to receive the at least one paging overlap occasion determination to one of the networks within at least one paging assistance information element.

The at least one paging assistance information element may comprise at least one of:
a definition of overlapping paging frames; a system frame number from which the paging overlap window starts; a paging overlap index identifying a first slot/symbol of the paging overlap; and a paging overlap length identifying a number of consecutive slot/symbols of the paging overlap.

The one or more of the identities may comprise one or more of: a universal subscriber identity module identity; an electronic subscriber identity module identity; and a subscriber identity module identity.

The one of the networks may be one of the same or different to the another of the networks.

According to an aspect there is provided a computer program comprising computer executable code which when run on at least one processor is configured to cause any of the previously described methods to be performed.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above. Any one of the above described features may be combined with any one or more other of the described features to provide one or more additional example embodiments, in addition to the various described example embodiments.

Various other aspects are also described in the following detailed description and in the attached claims.

BRIEF DESCRIPTION OF THE FIGURES

Example embodiments will now be described, by way of example only, with reference to the accompanying Figures in which:

FIG. 2 shows a schematic diagram of an example communication device;

FIG. 3 shows a schematic diagram of an example apparatus provided in an access node;

FIG. 8 shows a further signalling flow for the example network shown in FIG. 6 according to some embodiments according to some embodiments;

FIG. 10a shows a signalling flow for the example network shown in FIG. 9 according to some embodiments where the UE is registered and in a RRC Idle state for both networks.

DETAILED DESCRIPTION OF THE FIGURES

The following embodiments are exemplifying only. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other example embodiments.

As is known, wireless systems can be divided into cells, and are therefore often referred to as cellular systems. Typically, an access point such as a base station provides at least one cell. The cellular system can support communications between communications devices such as user equipment (UE).

In the following, different exemplifying embodiments will be described using, as an example of an access architecture to which some example embodiments may be applied, a radio access architecture based on long term evolution advanced (LTE Advanced, LTE-A) or new radio (NR) (or can be referred to as 5G), without restricting the example embodiments to such an architecture, however. It is clear for a person skilled in the art that the example embodiments may also be applied to other kinds of communications networks. Some examples of other options for suitable systems are the universal mobile telecommunications system (UMTS) radio access network (UTRAN or E-UTRAN), long term evolution (LTE, the same as E-UTRA), 2G networks (legacy network technology), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs), cellular internet of things (IoT) RAN and Internet Protocol multimedia subsystems (IMS), any other suitable option and/or any combination thereof.

In the following certain example embodiments are explained with reference to communications devices capable of communication via a wireless cellular system and communication systems serving such communications devices. Before explaining in detail the exemplifying embodiments, some principles of an example wireless communication system, access systems thereof, and communications devices are briefly explained with reference to FIGS. 1 to 5.

Figure 1:
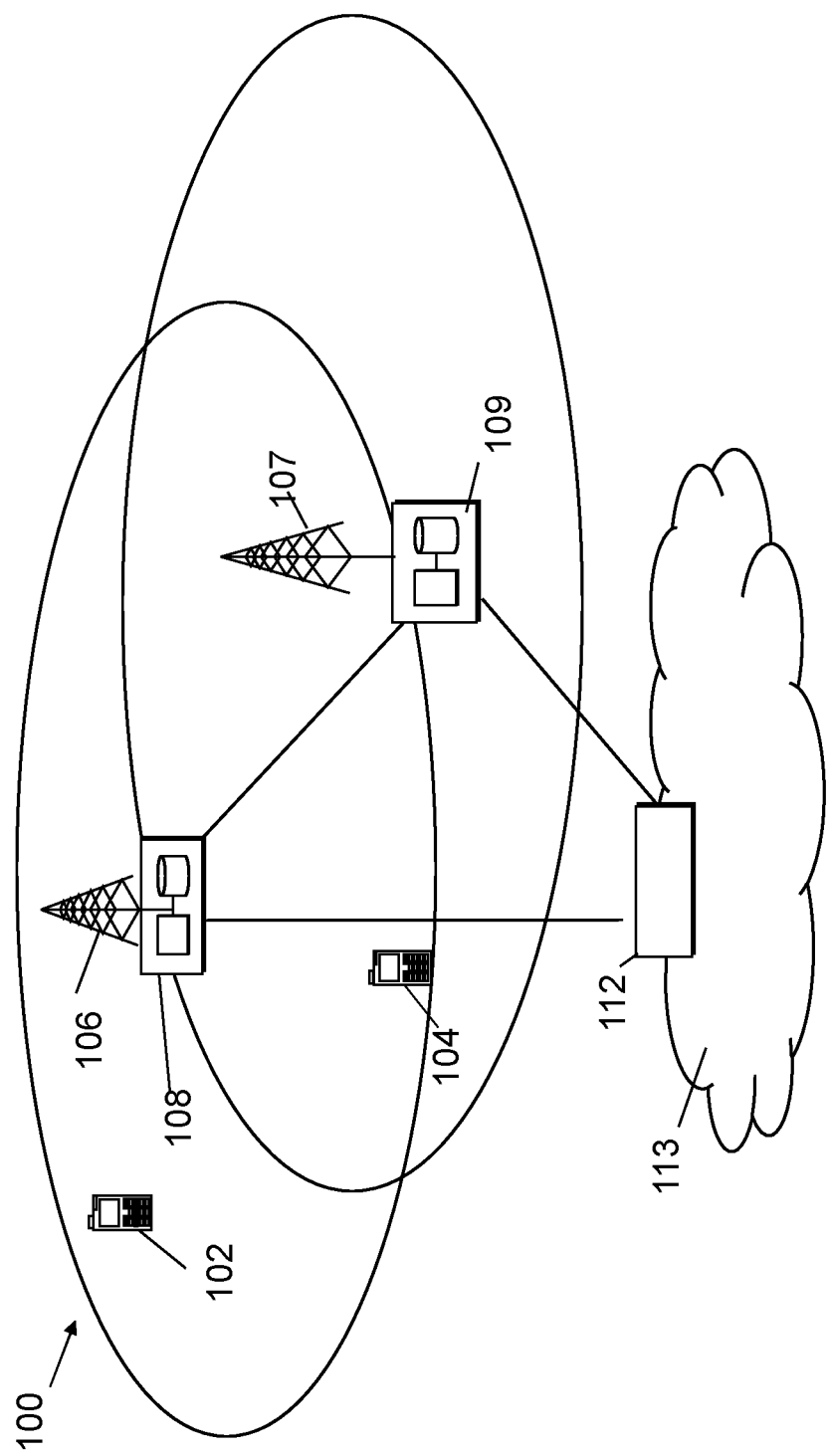
FIG. 1 shows a schematic diagram of an example communication system comprising a plurality of base stations and communication devices.

In a wireless communication system 100, such as that shown in FIG. 1, wireless communication devices, for example, user equipment (UE) or MTC (machine type communication) devices 102 and 104 are provided wireless access via at least one base station 106 and 107 or similar wireless transmitting and/or receiving wireless infrastructure access node or point. Such an access node can be, for example, a base station or an eNodeB (eNB), or in a 5G system a Next Generation NodeB (gNB), or other wireless infrastructure node. These access nodes will be generally referred to as base stations. Base stations are typically controlled by at least one appropriate controller apparatus, so as to enable operation thereof and management of communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity. In FIG. 1 control apparatus 108 and 109 are shown to control the respective macro level base stations 106 and 107. In some systems, the control apparatus may additionally or alternatively be provided in a separate entity.

In FIG. 1 base stations 106 and 107 are shown as connected to a wider communications network 113 via gateway 112.

The communication devices will be referred to as a UE (user equipment) in this document but it should be appreciated that the device may be any suitable communications device and the term UE is intended to cover any such device. Some examples of communications devices are discussed below and as used in this document the term UE is intended to cover any one or more of those devices and/or any other suitable device.

FIG. 2 illustrates an example of a communications device 300, such as the wireless communications devices 102, 104 and 105 shown on FIG. 1. The wireless communications device 300 may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, machine-type communications (MTC) devices, IoT type communications devices or any combinations of these or the like.

The device 300 may receive signals over an air or radio interface 307 via appropriate apparatus for receiving and may transmit signals via appropriate apparatus for transmitting radio signals. In FIG. 2 transceiver apparatus is designated schematically by block 306. The transceiver apparatus 306 may be provided for example by means of a radio part and associated antenna arrangement. The antenna arrangement may be arranged internally or externally to the mobile device.

The wireless communications device 300 may be provided with at least one processor 301 and at least one memory. The at least one memory may comprise at least one ROM 302a and/or at least one RAM 302b. The communications device may comprise other possible components 303 for use in software and hardware aided execution of tasks it is designed to perform, including control of access to and communications with access systems and other communications devices. The at least one processor 301 is coupled to the at least one memory. The at least one processor 301 may be configured to execute an appropriate software code 308 to implement one or more of the following aspects. The software code 308 may be stored in the at least one memory, for example in the at least one ROM 302a.

The processor, storage and other relevant control apparatus can be provided on an appropriate circuit board and/or in chipsets. This feature is denoted by reference 304.

The device may optionally have a user interface such as key pad 305, touch sensitive screen or pad, combinations thereof or the like.

Optionally one or more of a display, a speaker and a microphone may be provided depending on the type of the device.

Communication protocols and/or parameters which shall be used for the connection are also typically defined. The communications devices may access the communication system based on various access techniques.

An example apparatus is shown in FIG. 3. FIG. 3 shows an example of an apparatus 200 for a base station. The apparatus comprises at least one memory. The at least one memory may be at least one random access memory (RAM) 211a and/or at least one read only memory (ROM) 211b, at least one processor 212, 213 and an input/output interface 214. The at least one processor 212, 213 is coupled to the RAM 211a and the ROM 211b. The at least one processor 212, 213 may be configured to execute an appropriate software code 215 to implement one or more of the following aspects. The software code 215 may be stored in the ROM 211b.

Figure 4:
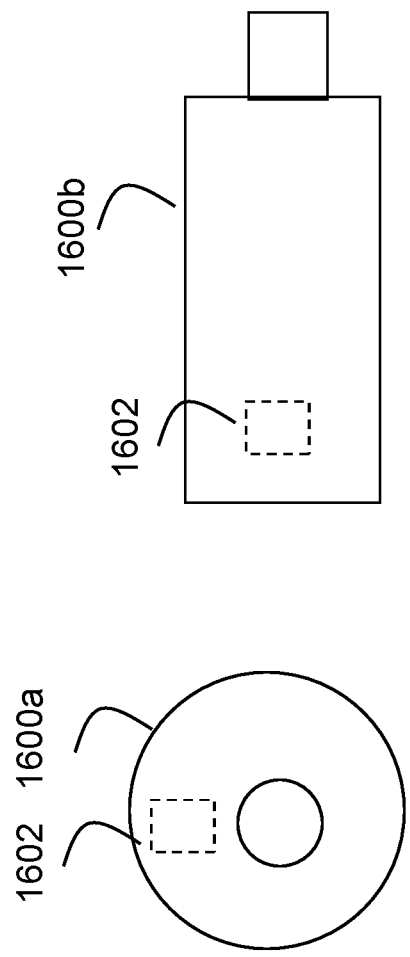
FIG. 4 shows a schematic representation of a non-volatile memory medium storing instructions which when executed by a processor allow a processor to perform one or more of the steps of the method of some embodiments.

FIG. 4 shows a schematic representation of non-volatile memory media 1600a (e.g. computer disc (CD) or digital versatile disc (DVD)) and 1600b (e.g. universal serial bus (USB) memory stick) storing instructions and/or parameters 1602 which when executed by a processor allow the processor to perform one or more of the steps of any of the methods of any of the example embodiments.

Figure 5:
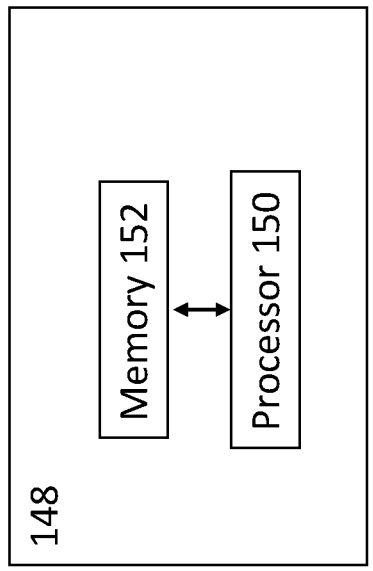
FIG. 5 shows an example apparatus which may be provided in a base station or a communications device or a network node.

FIG. 5 shows an apparatus 148. The apparatus 148 may be provided in the base station or in a communications device or in a core network node. The apparatus may comprise at least one processor 150 and at least one memory 152 including computer code for one or more programs. This apparatus may be configured to cause some embodiments to be performed.

Some communication devices are configured to have two or more separate subscriber identities. These two or more different subscriber identities may be supported by respective modules or functions.

In some example embodiments, the different subscriber identities may be supported by different subscriber identity modules (SIM) and/or universal subscriber identity module cards (USIM) and/or electronic subscriber identity modules (eSIM). These devices may be called multi-SIM/multi-USIM/multi-eSIM devices.

In some embodiments, one of the subscriber identities may be supported by one of a SIM, USIM, or eSIM and a different one of the subscriber identities may be supported by a different one of a SIM, USIM, or eSIM. For example one subscriber identity may be supported by an eSIM and a different subscriber identity supported by a USIM or the like. A SIM/USIM/eSIM or any other module or function supporting a subscriber identity can be either physical and/or virtual, for example, provided in software. The subscriber identities may belong to the same operator/network. In other examples, the subscriber identities may belong to two more different operators/networks.

Some example embodiments may be provided in 5G NR and/or LTE systems and/or any other suitable system.

In some situations within the network of Multi-USIM devices with dual registration capability, each UE may be configured to register independently with a 3GPP network. The 3GPP network could be a legacy network (for example a 4G/3G/2G) or a 5G or NR network. In the case of a Multi-USIM device, when in RRC Idle/RRC Inactive (in case of 5G) state, the UE can monitor a paging channel during the paging occasion for one network at a time where the UE supports only a single Rx.

Specific to Dual-USIM devices, there are different options or mode of operation such as—Single Rx/Single Tx UEs and Dual Rx/Single Tx UEs. Dual Rx allows the Dual-USIM device to simultaneously receive traffic from two networks. Single Rx allows the Dual-USIM device to receive traffic from one network at one time. Single Tx allows the Dual-USIM device to transmit traffic to one network at one time.

Paging Occasions (POs) are calculated based on the UE identifier. For example the UE identifier can be the international mobile subscriber identity (IMSI) for the evolved packet system (EPS) network type and 5G-Shortened-Temporary Mobile Subscriber Identity (5G-S-TMSI) for 5GS, respectively. The formulae for the determination of the POs are specified in 3GPP Technical standards TS 36.304 and TS 38.304 for E-UTRA and NR, respectively.

The embodiments as discussed herein provides aim to improve on the enablement of Paging Reception for Multi-USIM Device. A Multi-USIM device (for example—with Single Rx capability) may be unable to simultaneously monitor paging on all 3GPP radio access technologies (RATs) and there may be systems in which the UE is in an Idle state or RRC_Inactive state (for 5GS) but needs to make a choice of the paging channel(s) to monitor which can lead to unsuccessful paging on the other paging channel(s). Furthermore in some circumstances the UE identifier values associated with the different USIMs can lead to systematic collisions which may result in corresponding missed pages.

For these reasons some embodiments enable operation when the paging associated with the 3GPP RATs and systems in which the Multi-USIM device is in Idle state or RRC_Inactive state (for 5GS) overlap in time.

Furthermore some embodiments address the issue of how the network needs to be aware of specific UE communication constraints (e.g. Single Rx) in order to enable the Multi-USIM device to receive paging for each of the registered USIMs?

The concept as discussed in the embodiments herein is for a UE to be configured to provide overlapping PO information to the 5G network in the registration update procedure and the network to avoid paging during the overlapping PO to optimize resource usage.

The UE in some embodiments is configured to provide the overlapping PO information to the Access and Mobility Management Function (AMF) which stores the information and provides it to NG-RAN so that it can be used while paging the UE during the overlapping PO.

In some embodiments this is addressed for all possible scenarios of dual UE registration:

1) 5G and 4G/3G/2G legacy network (registered in any order).
2) 5G and 5G network.

In the following examples there is disclosed a single Rx/Tx UE, dual-USIM device, but can be extended to any Multi-USIM device without significant inventive effort as any multi-USIM device can be considered to be a device which comprises more than one dual-USIM sub-device.

The embodiments thus discuss with respect to a Multi-USIM device (UE) that the UE during registering with the second network is configured to determine that the paging occasion overlaps and calculates the overlapping paging occasions between the two networks. The UE may then be configured to indicate during an initial registration procedure with the second network (5G network) the overlapping paging occasions where the second network is 5G network and the first network is a legacy network (4G/3G/2G).

In some embodiments where the UE is registering with a legacy network (4G/3G/2G) as the second network, then after completion of attach procedure with the second network, which is legacy network (4G/3G/2G), the UE is configured to indicate the overlapping paging occasions to the first network (which is 5G) using a registration update procedure which can be triggered immediately (or substantially immediately).

In some embodiments the UE is configured to indicate the overlapping paging occasions to the second network where both first and second network are 5G.

In some embodiments the UE can be configured during a registration procedure (5G) or attach (EPS) procedure to indicate/negotiate different discontinuous reception (DRX) cycle value for both the networks, so that same DRX cycle value is not used for both of the networks.

Furthermore in some embodiments the UE is configured to provide the overlapping paging occasions in information elements (IE) such as the Paging-Assistance-IE to the network (for example the AMF) in a Non-access stratum (NAS) Registration Request message.

In some embodiments where the 5G network (AMF) changes any of the DRX cycle value/Paging related parameters in the NAS Registration Accept message, the UE can be configured to re-calculate the overlapping paging occasions and provides the updated overlapping paging occasions in the Paging-Assistance-IE (or a suitable information element) to the network (AMF) in the NAS Registration Complete message.

Additionally the UE can be configured in some embodiments to not monitor the paging channel during the overlapping paging occasions for the 5G network (if the other network is legacy network). In these embodiments the UE is configured to monitor the paging channel during the overlapping paging occasions for the legacy network (4G/3G/2G), in case one of the networks is a 5G network and the other network is a legacy network.

The UE, in some embodiments, can be configured to not monitor the paging channel during the overlapping paging occasions for the second registered 5G network but will be configured to monitor the paging channel during the overlapping paging occasions for first registered 5G network, in case both the networks are 5G.

The embodiments thus discuss with respect to a 5G Network element such as a Access and Mobility Management Function (AMF), NG Radio Access Network (NG-RAN). In some embodiments the network element (such as the AMF) is configured to store the information from Paging-Assistance-IE in the UE's context received by it during Registration procedure in NAS Registration request message or in NAS Registration complete message (for example in some embodiments the AMF is configured to change DRX cycle value/paging related parameter in NAS Registration accept message). Furthermore in some embodiments the network element (for example the AMF) is configured to try to page the UE. The network element is then configured to provide the Paging-Assistance-IE to the NG-RAN in the NGAP PAGING message. In some embodiments the NG-RAN is configured to use the information present in the Paging-Assistance-IE and avoid scheduling of paging messages to the UE during the overlapping paging occasions.

In implementing such embodiments it is possible to enable paging reception for Multi-USIM Device within the 5G network itself and without needing any further modifications in the legacy network. Ensuring the DRX cycle is different in both of the networks, in such embodiments, reduces the probability of overlapping PO (Paging occasions) between the networks.

The embodiments as discussed herein, by ensuring that the 5G Network does not page during the overlapping PO (Paging occasions) and letting the UE to listen to legacy network during the overlapping PO, optimizes the paging procedure and promotes efficient resource utilization in both of the networks.

Figure 6:
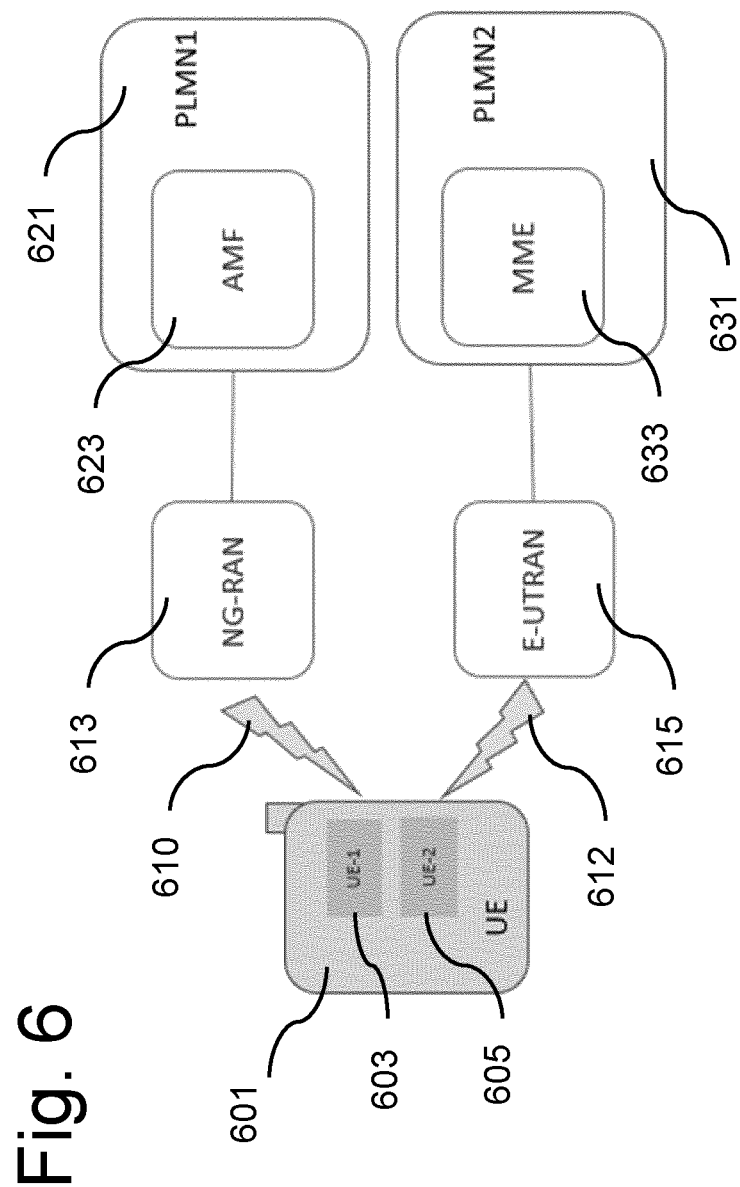
FIG. 6 shows a first network configuration suitable for implementing some embodiments where a first U-SIM is associated with a 5G network and a second U-SIM is associated with a legacy network.

With respect to FIG. 6 shows a first example network with a UE 601 comprising a dual-USIM configuration. The dual-USIM configuration is shown as UE-1 603 and UE-2 605.

In this example there is shown a legacy network comprising an Evolved-UMTS Terrestrial Radio Access Network (E-UTRAN) 615 which is the radio access network element coupled to a first public land mobile network (PLMN1) 631. The first public land mobile network (PLMN1) 631 comprises a Mobility Management Entity (MME) 633. In this example the Evolved-UMTS Terrestrial Radio Access Network (E-UTRAN) 615 is configured to communicate with the UE via UE-2 605 as shown by link 612.

Furthermore there is shown in this example a 5G or NG network comprising an NG Radio Access Network (NG-RAN) 615 which is the radio access network element coupled to a second public land mobile network (PLMN2) 621. The second public land mobile network (PLMN2) 621 comprises an Access and Mobility Management Function (AMF) 623. In this example the NG-RAN 613 is configured to communicate with the UE via UE-1 603 as shown by link 610. The NG-RAN 613 can in some embodiments comprise a gNB.

In this example during the initial registration, the UE 601 is configured to negotiate the DRX parameters with the core network and calculates the paging occasions based on the DRX cycle. The UE 601 can be configured with different DRX cycles for different networks, which can lead to overlapping paging occasions. The UE 601 can be configured to monitor any one of the networks for paging message during the overlapping paging occasion. The UE 601 is furthermore configured to negotiate a DRX cycle in such a way that it will have minimal overlapping paging occasions between UE-1 603 with SIM1 and UE-2 605 with SIM2.

The UE 601 is furthermore configured to provide the overlapping paging occasions information to the 5G AMF 623 using an initial or event triggered registration procedure. AMF shall store the paging assistance information for the UE and shall provide the same information to the gNB during PAGING. In some embodiments the gNB is configured to use the paging assistance information for scheduling paging message and avoid paging the UE during the overlapping paging occasions. The UE 601 furthermore is configured to not listen to paging messages from the 5G network and only listen to 4G network in the overlapping paging occasion.

In other words, as shown in FIG. 6 and explained above the device UE has two USIMs or two credentials, where UE-1 603 with credential-1/SIM1 is subscribed to 5G services (via the NG Radio Access Network (NG-RAN) 615 and UE-2 605 with credential-2/SIM2 is subscribed to 4G services via an Evolved-UMTS Terrestrial Radio Access Network (E-UTRAN) 615. It is understood that the UE-2 could be configured to subscribe to any legacy network (4G/3G/2G)).

Thus for example UE-1 603 is in a NAS MM-DEREGISTERED state and UE-2 605 (2G/3G/4G) is in NAS MM-REGISTERED state and listening to paging messages.

Figure 7A:
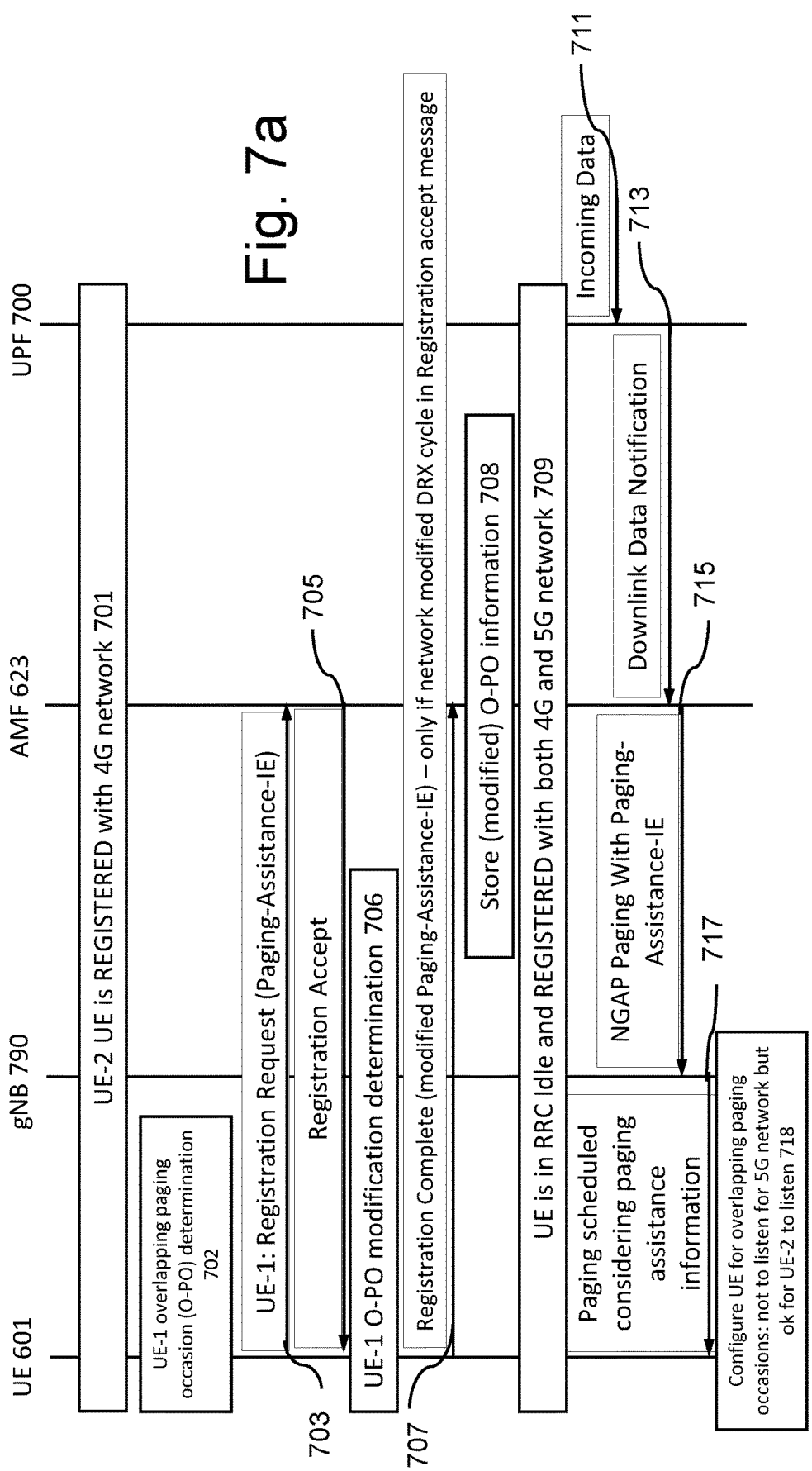
FIG. 7a shows a signalling flow for the example network shown in FIG. 6 according to some embodiments where the UE is registered and in a RRC Idle state for both networks.

In the example shown in FIG. 7a the UE-2 605 with credential-2/SIM2 is REGISTERED for 4G services via an Evolved-UMTS Terrestrial Radio Access Network (E-UTRAN) 615 as shown in FIG. 7a by step 701.

In some embodiments UE-1 calculates or determines the overlapping paging occasions based on the paging occasions for UE-2 as shown in FIG. 7a by step 702.

The UE-1 603, in some embodiments, is configured to trigger an initial registration procedure. This is shown in FIG. 7a by the UE-1 registration request as shown in FIG. 7a by step 703. In some embodiments the registration request comprises paging assistance information elements (Paging-Assistance-IE) which comprises the determined overlapping paging occasions.

The initial registration request may then be accepted by the AMF 623 as shown in FIG. 7a by step 705.

In some embodiments the UE-1 determines whether the network has changed any of the DRX/PAGING related parameters which can be found from the NAS Registration Accept message. In such circumstances the UE is configured to re-calculate overlapping paging occasions (O-PO) for UE-1 using the updated DRX parameters. This is shown in FIG. 7a by the step 706.

Furthermore based on the UE-1 determining whether there has been any overlapping paging occasion (O-PO)

modifications the UE is configured to provide the updated overlapping paging occasions in Paging-Assistance-IE In a NAS Registration Complete message to the AMF as shown in FIG. 7a by step 707.

The AMF 623 is then configured to store the O-PO information present in the (modified) Paging-Assistance-IE in the UE's context as shown in FIG. 7a by step 708.

In this example the UE is in a RRC Idle and REGISTERED state with both the 4G and 5G network as shown in FIG. 7a by step 709.

The example further shows that there is incoming data for the UE as shown in FIG. 7 by the incoming data to the user plane function (UPF) 700 as shown in step 711.

The UPF 700 can then be configured to generate and pass a downlink data notification to the AMF 623 as shown in FIG. 7a by step 713.

When the AMF 623 tries to page the UE 601, it provides the Paging-Assistance-IE to the gNB 790 in a suitable NGAP PAGING message as shown in FIG. 7a by step 715.

Furthermore the gNB 790 is configured to use the information present in the Paging-Assistance-IE and avoid scheduling of paging messages to the UE 601 during the overlapping paging occasions as shown in FIG. 7a by step 717.

Furthermore the UE is configured not to try to listen for paging messages for 5G network but it will listen to paging messages for UE-2 during the overlapping paging occasions as shown in FIG. 7a by step 718.

In some embodiments there may be the efficient handling of paging-assistance-IE as part of Core Network assisted RAN paging information as well to aid in RAN Paging when the UE is in a RRC Inactive state. This for example with respect to the network example shown in FIG. 6 UE may be shown further with respect to FIG. 7b.

Figure 7B:
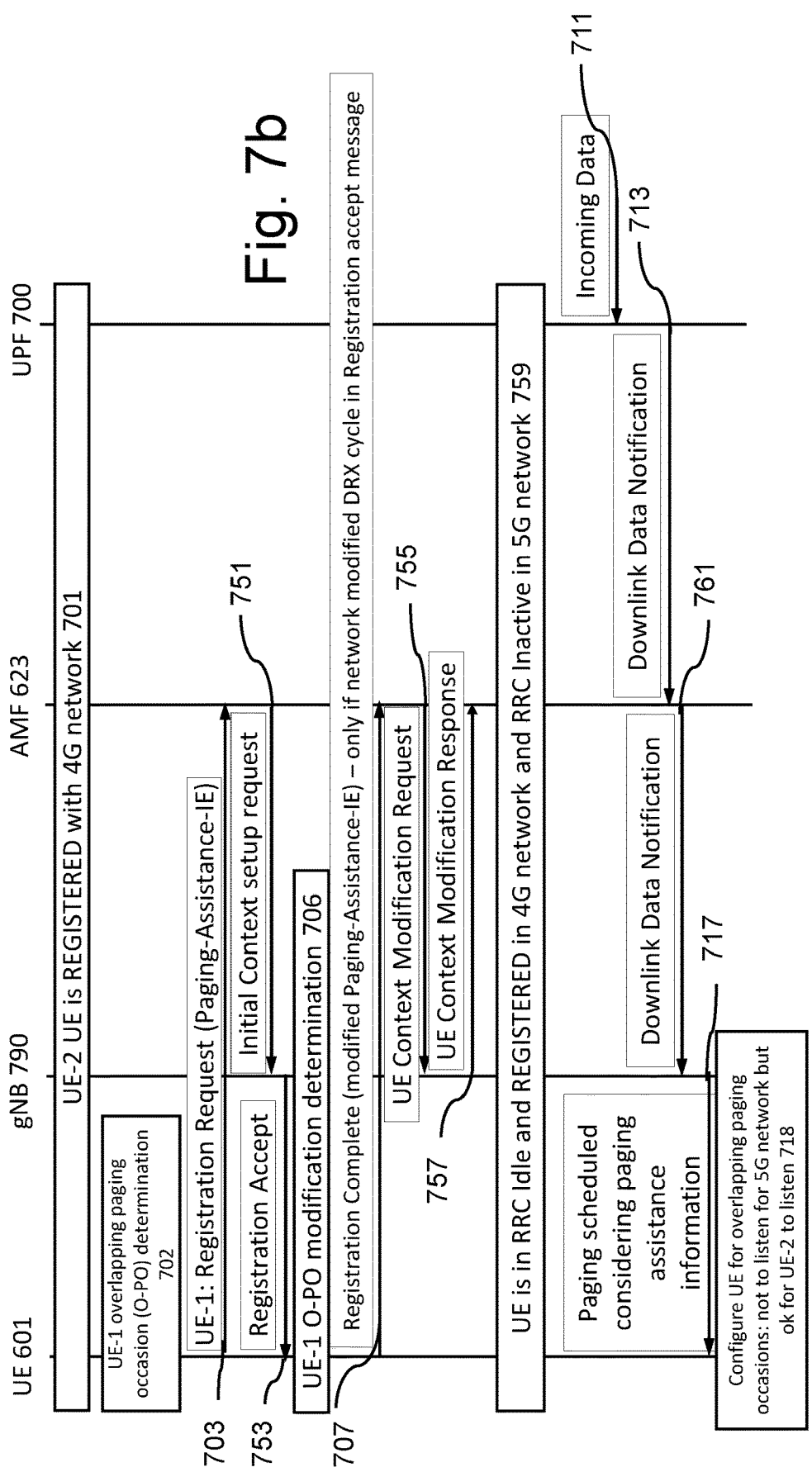
FIG. 7b shows a signalling flow for the example network shown in FIG. 6 according to some embodiments where the UE is registered and in a RRC Idle state for the legacy network and in a RRC Inactive state for the 5G network.

In the example shown in FIG. 7b the UE-2 605 with credential-2/SIM2 is REGISTERED for 4G services via an Evolved-UMTS Terrestrial Radio Access Network (E-UTRAN) 615 as shown in FIG. 7b by step 701.

In some embodiments UE-1 calculates or determines the overlapping paging occasions based on the paging occasions for UE-2 as shown in FIG. 7b by step 702.

The UE-1 603, in some embodiments, is further configured to trigger an initial registration procedure. This is shown in FIG. 7 by the UE-1 registration request as shown in FIG. 7b by step 703. As discussed above in some embodiments the registration request comprises paging assistance information elements (Paging-Assistance-IE) which comprises the determined overlapping paging occasions.

The initial registration request may then be accepted by the AMF 623 and is then configured to generate an initial context setup request which is then transmitted to the gNB 790 as shown in FIG. 7b by step 751. The initial context setup request can in some embodiments comprises core network assistance information for the RRC INACTIVE UE (and which in some embodiments comprises the Paging-Assistance-IE as well).

The gNB 790 can furthermore transmit a registration accept message to the UE as shown in FIG. 7b by step 753.

In some embodiments the UE-1 determines whether the network has changed any of the DRX/PAGING related parameters which can be found from the NAS Registration Accept message. In such circumstances the UE is configured to re-calculate overlapping paging occasions (O-PO) for UE-1 using the updated DRX parameters. This is shown in FIG. 7b by the step 706.

Furthermore based on the UE-1 determining whether there has been any overlapping paging occasion (O-PO) modifications the UE is configured to provide the updated overlapping paging occasions in a modified Paging-Assistance-IE and which may be found within a NAS Registration Complete message to the AMF as shown in FIG. 7b by step 707.

In some embodiments the AMF may then be triggered, where it determines a change in the Paging-Assistance-IE, to generate a UE context modification request. The UE context modification request can in some embodiments comprise the modified Paging-Assistance-IE as part of Core Network assisted RAN paging information or other suitable message type to inform the gNB 790 of the modified O-PO information. The generation and transmission of the UE context modification request is shown in FIG. 7b by step 755.

The gNB 790 having received the UE context modification request is configured to process it to modify any stored O-PO information and/or to modify any paging scheduling. Having processed the modified information the gNB 790 is configured to generate and transmit back to the AMF a UE context modification response message as shown in FIG. 7b by step 757.

In this example the UE is in an RRC Idle and REGISTERED state for the 4G network and in a registered and RRC Inactive state for the 5G network as shown in FIG. 7b by step 759.

The example further shows that there is incoming data for the UE as shown in FIG. 7b by the incoming data to the user plane function (UPF) 700 as shown in step 711.

The UPF 700 can then be configured to generate and pass a downlink data notification to the AMF 623 as shown in FIG. 7b by step 713.

The AMF 623 is then configured to provide the downlink data notification information to the gNB 790 as shown in FIG. 7b by step 761.

Furthermore the gNB 790 is configured to use the information stored previously in the (modified) Paging-Assistance-IE or suitable information or indicators within the initial context setup request or modification request and avoid scheduling of paging messages to the UE 601 during the overlapping paging occasions as shown in FIG. 7b by step 717.

Furthermore the UE is configured not to try to listen for paging messages for 5G network but it will listen to paging messages for UE-2 during the overlapping paging occasions as shown in FIG. 7 by step 718.

With respect to FIG. 8 is shown a further example according to some embodiments. In this example the UE-1 603 (connecting to the 5G Network) is in NAS MM-REGISTERED state and listening to paging messages. UE-2 605 (2G/3G/4G) is in NAS MM-DEREGISTERED state.

Thus for example UE-1 603 is shown with the UE registered with the network and is in an idle/connected state as shown in FIG. 8 by step 800.

Furthermore UE-2 605 is shown with the UE REGISTERED with the network following the UE being configured to performs an initial attach procedure as shown in FIG. 8 by step 801.

In some embodiments UE-1 calculates or determines the overlapping paging occasions based on the paging occasions for UE-2 as shown in FIG. 8 by step 802.

The UE-1 603, in some embodiments, is configured to trigger an initial registration procedure. This is shown in FIG. 8 by the UE-1 registration request as shown in FIG. 8 by step 803. In some embodiments the registration request comprises paging assistance information elements (Paging-Assistance-IE) which comprises the determined overlapping paging occasions.

The initial registration request may then be accepted by the AMF 623 as shown in FIG. 8 by step 805.

In some embodiments the UE-1 determines whether the network has changed any of the DRX/PAGING related parameters which can be found from the NAS Registration Accept message. In such circumstances the UE is configured to re-calculate overlapping paging occasions (O-PO) for UE-1 using the updated DRX parameters. This is shown in FIG. 8 by the step 806.

Furthermore based on the UE-1 determining whether there has been any overlapping paging occasion (O-PO) modifications the UE is configured to provide the updated overlapping paging occasions in Paging-Assistance-IE In a NAS Registration Complete message to the AMF as shown in FIG. 8 by step 807.

The AMF 623 is then configured to store the O-PO information present in the (modified) Paging-Assistance-IE in the UE's context as shown in FIG. 8 by step 808.

In this example the UE is in a RRC Idle in both SIMS as shown in FIG. 8 by step 809.

The example further shows that there is incoming data for the UE as shown in FIG. 8 by the incoming data to the user plane function (UPF) 700 as shown in step 811.

The UPF 700 can then be configured to generate and pass a downlink data notification to the AMF 623 as shown in FIG. 8 by step 813.

When the AMF 623 tries to page the UE 601, it provides the Paging-Assistance-IE to the gNB 790 in a suitable NGAP PAGING message as shown in FIG. 8 by step 815.

Furthermore the gNB 790 is configured to use the information present in the Paging-Assistance-IE and avoid scheduling of paging messages to the UE 601 during the overlapping paging occasions as shown in FIG. 8 by step 817.

Furthermore the UE-1 is configured not to try to listen for paging messages for 5G network but it will listen to paging messages for UE-2 during the overlapping paging occasions as shown in FIG. 8 by step 818.

Figure 9:
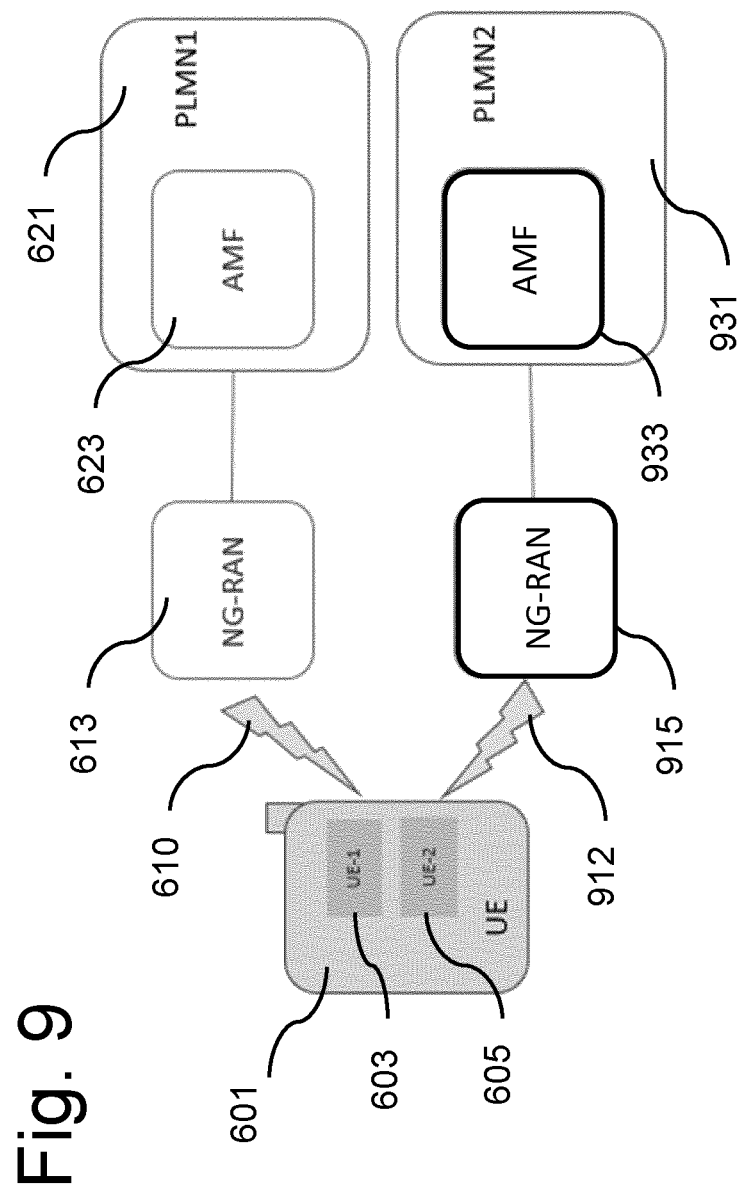
FIG. 9 shows a second network configuration suitable for implementing some embodiments where a both the first and second U-SIM are associated with a 5G network.

With respect to FIG. 9 shows a second example network with a UE 601 comprising a dual-USIM configuration. The dual-USIM configuration is shown as UE-1 603 and UE-2 605.

There is shown in this example a 5G or NG network comprising an NG Radio Access Network (NG-RAN) 615 which is the radio access network element coupled to a second public land mobile network (PLMN2) 621. The second public land mobile network (PLMN2) 621 comprises an Access and Mobility Management Function (AMF) 623. In this example the NG-RAN 613 is configured to communicate with the UE via UE-1 603 as shown by link 610. The NG-RAN 613 can in some embodiments comprise a gNB.

Furthermore and differing from the example shown in FIG. 6 there is shown in this example a further 5G or NG network comprising a further NG Radio Access Network (NG-RAN) 915 which is the radio access network element coupled to a further public land mobile network (PLMN2) 931. The further public land mobile network (PLMN2) 931 comprises a further Access and Mobility Management Function (AMF) 933. In this example the further NG-RAN 915 is configured to communicate with the UE via UE-2 605 as shown by link 912. The further NG-RAN 915 can in some embodiments comprise a gNB.

The device UE thus has two USIMs or two credentials, where UE-1 603 with credential-1/SIM1 is subscribed to 5G services (via the NG Radio Access Network (NG-RAN) 615 and UE-2 605 with credential-2/SIM2 is subscribed to further 5G services (via the further NG Radio Access Network (NG-RAN) 915.

In the example shown in FIG. 10*a* the UE-1 603 with credential-1/SIM1 registers for 5G services and is in an idle/connected state as shown in FIG. 10*a* by step 1001.

In some embodiments UE-2 calculates or determines the overlapping paging occasions based on the paging occasions for UE-1 as shown in FIG. 10*a* by step 1002.

The UE-2 605, in some embodiments, is configured to trigger an initial registration procedure. This is shown in FIG. 10*a* by the UE-2 registration request as shown in FIG. 10*a* by step 1003. In some embodiments the registration request comprises paging assistance information elements (Paging-Assistance-IE) which comprises the determined overlapping paging occasions.

The initial registration request may then be accepted by the AMF 623 as shown in FIG. 10*a* by step 1005.

In some embodiments the UE-2 determines whether the network has changed any of the DRX/PAGING related parameters which can be found from the NAS Registration Accept message. In such circumstances the UE is configured to re-calculate overlapping paging occasions (O-PO) for UE-2 using the updated DRX parameters. This is shown in FIG. 10*a* by the step 1006.

Furthermore based on the UE-2 determining whether there has been any overlapping paging occasion (O-PO) modifications the UE is configured to provide the updated overlapping paging occasions in Paging-Assistance-IE In a NAS Registration Complete message to the AMF as shown in FIG. 10*a* by step 1007.

The AMF 623 is then configured to store the O-PO information present in the (modified) Paging-Assistance-IE in the UE's context as shown in FIG. 10*a* by step 1008.

In this example the UE is in an RRC Idle and REGISTERED state with both 5G networks as shown in FIG. 10*a* by step 1009.

The example further shows that there is incoming data for the UE as shown in FIG. 10*a* by the incoming data to the user plane function (UPF) 1000 as shown in step 1011.

The UPF 700 can then be configured to generate and pass a downlink data notification to the AMF 623 as shown in FIG. 10*a* by step 1013.

When the AMF 623 tries to page the UE 601, it provides the Paging-Assistance-IE to the gNB 1090 in a suitable NGAP PAGING message as shown in FIG. 10*a* by step 1015.

Furthermore the gNB 1090 is configured to use the information present in the Paging-Assistance-IE and avoid scheduling of paging messages to the UE 601 during the overlapping paging occasions as shown in FIG. 10*a* by step 1017.

Furthermore the UE-2 is configured not to try to listen for paging messages for 5G network but it will listen to paging messages for UE-1 during the overlapping paging occasions as shown in FIG. 10*a* by step 1018.

In a manner similar shown above with respect to the example network shown in FIG. 6 one of the SIMs in the UE is in an RRC Inactive state while the other is in an RRC Idle state.

Figure 10B:
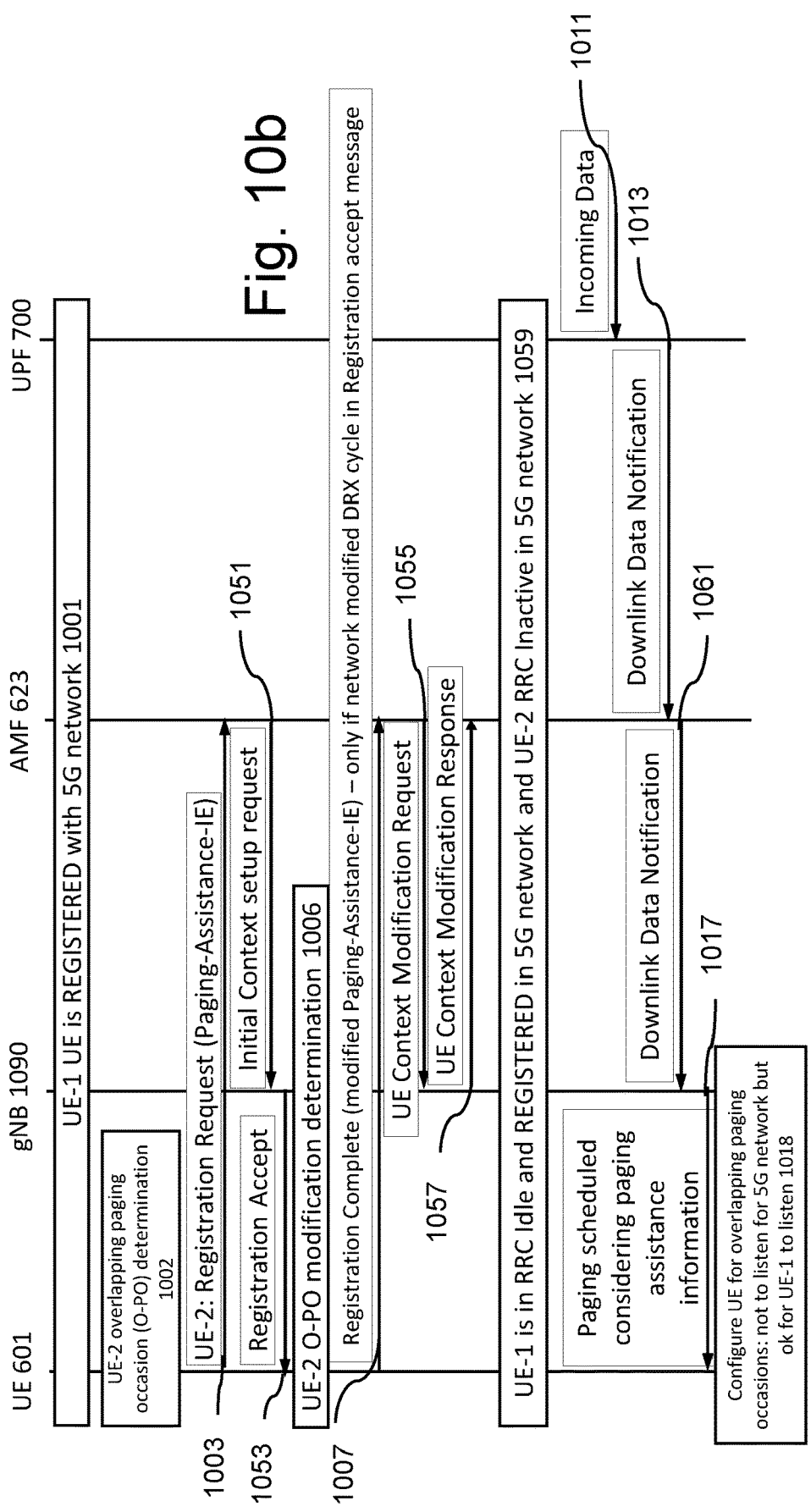
FIG. 10b shows a signalling flow for the example network shown in FIG. 9 according to some embodiments where the UE is registered and in a RRC Idle state for one of the networks and in a RRC Inactive state for another of the networks.

In the example shown in FIG. 10*a* the UE-1 603 with credential-1/SIM1 registers for 5G services and is in an idle/connected state as shown in FIG. 10*b* by step 1001.

In some embodiments UE-2 calculates or determines the overlapping paging occasions based on the paging occasions for UE-1 as shown in FIG. 10*b* by step 1002.

The UE-2 605, in some embodiments, is configured to trigger an initial registration procedure. This is shown in FIG. 10*b* by the UE-2 registration request as shown in FIG. 10*b* by step 1003. In some embodiments the registration request comprises paging assistance information elements (Paging-Assistance-IE) which comprises the determined overlapping paging occasions.

The initial registration request may then be accepted by the AMF 623 and is then configured to generate an initial context setup request which is then transmitted to the gNB 1090 as shown in FIG. 10b by step 1051. The initial context setup request can in some embodiments comprises core network assistance information for the RRC INACTIVE UE (and which in some embodiments comprises the Paging-Assistance-IE as well).

The gNB 1090 can furthermore transmit a registration accept message to the UE as shown in FIG. 7b by step 1053.

In some embodiments the UE-2 determines whether the network has changed any of the DRX/PAGING related parameters which can be found from the NAS Registration Accept message. In such circumstances the UE is configured to re-calculate overlapping paging occasions (O-PO) for UE-2 using the updated DRX parameters. This is shown in FIG. 10b by the step 1006.

Furthermore based on the UE-2 determining whether there has been any overlapping paging occasion (O-PO) modifications the UE is configured to provide the updated overlapping paging occasions in Paging-Assistance-IE In a NAS Registration Complete message to the AMF as shown in FIG. 10a by step 1007.

In some embodiments the AMF may then be triggered, where it determines a change in the Paging-Assistance-IE, to generate a UE context modification request. The UE context modification request can in some embodiments comprise the modified Paging-Assistance-IE or other suitable message type to inform the gNB 1090 of the modified O-PO information. The generation and transmission of the UE context modification request is shown in FIG. 10b by step 1055.

The gNB 1090 having received the UE context modification request is configured to process it to modify any stored O-PO information and/or to modify any paging scheduling. Having processed the modified information the gNB 1090 is configured to generate and transmit back to the AMF a UE context modification response message as shown in FIG. 10b by step 1057.

In this example the UE is in an RRC Idle and REGISTERED state for one 5G network and REGISTERED and RRC Inactive state for the other as shown in FIG. 10b by step 1009.

The example further shows that there is incoming data for the UE as shown in FIG. 10b by the incoming data to the user plane function (UPF) 1000 as shown in step 1011.

The UPF 700 can then be configured to generate and pass a downlink data notification to the AMF 623 as shown in FIG. 10a by step 1013.

The AMF 623 is then configured to provide the downlink data notification information to the gNB 1090 as shown in FIG. 10b by step 1061.

Furthermore the gNB 1090 is configured to use the information stored previously in the (modified) Paging-Assistance-IE or suitable information or indicators within the initial context setup request or modification request and avoid scheduling of paging messages to the UE 601 during the overlapping paging occasions as shown in FIG. 10b by step 1017.

Furthermore the UE-2 is configured not to try to listen for paging messages for 5G network but it will listen to paging messages for UE-1 during the overlapping paging occasions as shown in FIG. 10b by step 1018.

In some embodiments the PAGING-ASSISTANCE-IE definition can be as follows:

Paging-Assistance-IE
   Overlapping-Paging-Frames
      SFN (System frame number from which the PO window starts)
      PO-Index (first slot/symbol of the PO)
      PO-Length (number of consecutive slot/symbols of the PO).

This definition is an example only and it would be appreciated that the information elements may define the PO in any suitable manner.

The above examples show the passing of O-PO information within registration request messages and context setup messages. It would be understood that in some embodiments the O-PO information can be passed in other messages. For example in some embodiments the O-PO information can be passed within a HANDOVER REQUEST message or a PATH SWITCH REQUEST ACKNOWLEDGE message. In such embodiments an AMF need not explicitly indicate the details to the new base station, which will help when UE moves to RRC Inactive state in the new base station.

It is noted that while the above describes example embodiments, there are several variations and modifications which may be made to the disclosed solution without departing from the scope of the present invention. In particular, different example embodiments have been described. Different features from different embodiments may be combined.

The example embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various example embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Some example embodiments may be implemented by computer software stored in a memory and executable by at least one data processor of the involved entities or by hardware, or by a combination of software and hardware. Further in this regard it should be noted that any of the above procedures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples.

Alternatively or additionally some example embodiments may be implemented using circuitry. The circuitry may be configured to perform one or more of the functions and/or method steps previously described. That circuitry may be provided in the base station and/or in the communications device and/or a network node.

As used in this application, the term "circuitry" may refer to one or more or all of the following:

(a) hardware-only circuit implementations (such as implementations in only analogue and/or digital circuitry);
(b) combinations of hardware circuits and software, such as:
  (i) a combination of analogue and/or digital hardware circuit(s) with software/firmware and
  (ii) any portions of hardware processor(s) with software (including digital signal processor(s)), software, and memory(ies) that work together to cause an apparatus, such as the communications device or base station to perform the various functions previously described; and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments. However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

We claim:

1. An apparatus in a communications device supporting a plurality of different identities, the apparatus comprising at least one processor and at least one memory including computer program code, the at least one memory and computer program code configured to, with the at least one processor, cause the apparatus at least to:
  determine at least one paging overlap occasion for networks associated with the different identities;
  communicate the at least one paging overlap occasion determination to one of the networks associated with one of the different identities within a registration request to the one of the networks, wherein the one of the networks is caused to schedule at least one paging message to the apparatus based on the at least one paging overlap occasion determination such that the at least one paging message is scheduled at a time other than the at least one paging overlap occasion determination; and
  control a reception of the at least one paging message for the one of the networks such that the apparatus is caused not to listen for a paging message for the one of the networks during the determined at least one paging overlap occasion and control a reception of at least one paging message for a further one of the networks associated with the different identities during the determined at least one paging overlap occasion,
wherein communicating the at least one paging overlap occasion determination to one of the networks associated with the different identities within a registration request to the one of the networks further comprises communicating the at least one paging overlap occasion determination to one of the networks within at least one paging assistance information element,
wherein the at least one paging assistance information element comprises:
  a definition of overlapping paging frames;
  a system frame number from which the paging overlap window starts;
  a paging overlap index identifying a first slot/symbol of the paging overlap; and
  a paging overlap length identifying a number of consecutive slot/symbols of the paging overlap,
wherein the identities comprise a universal subscriber identity module identity; an electronic subscriber identity module identity; and a subscriber identity module identity.

2. The apparatus as claimed in claim 1, wherein the at least one memory and computer program code are configured to, with the at least one processor, cause the apparatus at least to:
  determine a modification of the at least one paging overlap occasion for the different identities based on information received in an acceptance of the registration request;
  communicate the modification of the at least one paging overlap occasion to the one of the networks associated with the different identities within a registration complete message to the one of the networks, wherein the one of the networks is caused to schedule at least one paging message to the apparatus based on the modified at least one paging overlap occasion such that the at least one paging message is scheduled at a time other than the at least one modified paging overlap occasion; and wherein the apparatus caused to control a reception of the at least one paging message for the one of the networks such that the apparatus is caused not to listen for a paging message for the one of the networks during the determined at least one paging overlap occasion and control a reception of at least one paging message for a further from the networks associated with the different identities during the determined at least one paging overlap occasion is caused to control a reception of the at least one paging message for the one of the networks such that the apparatus is caused not to listen for a paging message for the one of the networks during the modified at least one paging overlap occasion and control a reception of at least one paging message for a further from the networks associated with the different identities during the modified at least one paging overlap occasion.

3. The apparatus as claimed in claim 1, wherein the at least one memory and computer program code are configured to, with the at least one processor, cause the apparatus at least to control a registration or attach procedure to the one of the networks, wherein the apparatus is caused to indicate or negotiate a different discontinuous receive cycle value for the one of the networks compared to the discontinuous receive cycle value for the another of the networks.

4. The apparatus as claimed in claim 3, caused to negotiate a plurality of discontinuous reception (DRX) parameters with a core network and calculate a plurality of paging occasions based on a DRX cycle, wherein the apparatus is configured with different DRX cycles for different networks and further configured to monitor any one of the networks for paging messages during the overlapping paging occasion, wherein the apparatus is further configured to negotiate a DRX cycle that it will have minimal overlapping paging occasions between the identities.

5. The apparatus as claimed in claim 4, wherein
in the case where the network changes any of the DRX cycle value/Paging related parameters in a NAS Registration Accept message, the apparatus is configured to re-calculate the overlapping paging occasions and provide the updated overlapping paging occasions in the paging assistance information element to the network in the NAS Registration Complete message.

6. The apparatus as claimed in claim 5, wherein
the apparatus is configured to not monitor the paging channel during the overlapping paging occasions for the network if the other network is a legacy network, and
the apparatus is configured to not monitor the paging channel during the overlapping paging occasions for a second registered network and is configured to monitor the paging channel during the overlapping paging occasions for a registered, in the case where both the networks are fifth generation (5G).

7. The apparatus as claimed in claim 1, wherein the one of the networks is one of the same or different to the another of the networks.

8. An apparatus comprising at least one processor and at least one memory including a computer program code, the at least one memory and computer program code configured to, with the at least one processor, cause the apparatus at least to:
receive, from a further apparatus supporting a plurality of different identities associated a plurality of networks, information within a registration request detailing at least one paging overlap occasion for one of the networks and another of the networks associated with the different identities; and
control the scheduling of at least one paging message to the further apparatus for the one of the networks based on the at least one paging overlap occasion such that the at least one paging message for the one of the networks is scheduled at a time other than the at least one paging overlap occasion determination,
wherein the at least one memory and computer program code are configured to, with the at least one processor, cause the apparatus at least to, in response to the information within a registration request detailing at least one paging overlap occasion:
modify a discontinuous reception cycle value/paging related parameter for the one of the networks, received within the registration request; and
communicate the modified discontinuous reception cycle value/paging related parameter for the one of the networks to the further apparatus within a registration accept message for the one of the networks,
wherein the at least one memory and computer program code are configured to, with the at least one processor, cause the apparatus at least to:
receive, within a registration complete message, a modification of the at least one paging overlap occasion for the one of the networks and the another of the networks associated with the different identities; and
control the scheduling of at least one paging message to the further apparatus for the one of the networks based on the modification of the at least one paging overlap occasion such that the at least one paging message for the one of the networks is scheduled at a time other than the modified at least one paging overlap occasion,
wherein the apparatus caused to control the scheduling of at least one paging message for the one of the networks to the further apparatus based on the modification of the at least one paging overlap occasion is caused to communicate the scheduling of at least one paging message for the one of the networks to the further apparatus based on the modification of the at least one paging overlap occasion within a message to a radio access network node for the network,
wherein the apparatus caused to communicate the scheduling of at least one paging message for the one of the networks to the further apparatus based on the modification of the at least one paging overlap occasion within a message to a radio access network node for the network is caused to perform:
communicating the scheduling of at least one paging message for the one of the networks to the further apparatus within a next generation application protocol paging message to the radio access network node; and
communicating the scheduling of at least one paging message for the one of the networks to the further apparatus within a modified context message to the radio access network node,
wherein the at least one paging assistance information element comprises:
a definition of overlapping paging frames;
a system frame number from which the paging overlap window starts;
a paging overlap index identifying a first slot/symbol of the paging overlap; and
a paging overlap length identifying a number of consecutive slot/symbols of the paging overlap,
wherein the identities comprise: a universal subscriber identity module identity; an electronic subscriber identity module identity; and a subscriber identity module identity.

9. The apparatus as claimed in claim 8, wherein the modified context message is a modified user equipment context message.

10. The apparatus as claimed in claim 9, wherein the apparatus caused to control the scheduling of at least one paging message for the one of the networks to the further apparatus based on the at least one paging overlap occasion is caused to control the scheduling of at least one paging message for the one of the networks to the further apparatus based on the at least one paging overlap occasion when the one of the networks is a fifth generation (5G) network.

11. The apparatus as claimed in claim 9, wherein the apparatus caused to control the scheduling of at least one paging message for the one of the networks to the further apparatus based on the at least one paging overlap occasion is caused to communicate the scheduling of at least one paging message for the one of the networks to the further apparatus based on the at least one paging overlap occasion within a message to a radio access network node for the network.

12. The apparatus as claimed in claim 9, caused to receive information within a registration request detailing at least one paging overlap occasion for one of the networks and another of the networks associated with the different identities is caused to receive the at least one paging overlap occasion determination to one of the networks within at least one paging assistance information element.

13. The apparatus as claimed in claim 8, wherein the one of the networks is one of the same or different to the another of the networks.

14. A method for an apparatus operating as a communications device supporting a plurality of different identities, the method comprising:
determining at least one paging overlap occasion for networks associated with the different identities;
communicating the at least one paging overlap occasion determination to one of the networks associated with one of the different identities within a registration request to the one of the networks, wherein the one of the networks is caused to schedule at least one paging message to the apparatus based on the at least one paging overlap occasion determination such that the at least one paging message is scheduled at a time other than the at least one paging overlap occasion determination; and
controlling a reception of the at least one paging message for the one of the networks such that the apparatus is caused not to listen for a paging message for the one of the networks during the determined at least one paging overlap occasion and control a reception of at least one paging message for a further one of the networks associated with the different identities during the determined at least one paging overlap occasion,
wherein communicating the at least one paging overlap occasion determination to one of the networks associated with the different identities within a registration request to the one of the networks further comprises communicating the at least one paging overlap occasion determination to one of the networks within at least one paging assistance information element,
wherein the at least one paging assistance information element comprises:
a definition of overlapping paging frames;
a system frame number from which the paging overlap window starts;
a paging overlap index identifying a first slot/symbol of the paging overlap; and
a paging overlap length identifying a number of consecutive slot/symbols of the paging overlap,
wherein the identities comprise a universal subscriber identity module identity; an electronic subscriber identity module identity; and a subscriber identity module identity.

15. A method for an apparatus within a communications system, the method comprising:
receiving, from a further apparatus supporting a plurality of different identities associated a plurality of networks, information within a registration request detailing at least one paging overlap occasion for one of the networks and another of the networks associated with the different identities; and
controlling the scheduling of at least one paging message to the further apparatus for the one of the networks based on the at least one paging overlap occasion such that the at least one paging message for the one of the networks is scheduled at a time other than the at least one paging overlap occasion determination,
wherein the method further comprises, in response to the information within a registration request detailing at least one paging overlap occasion:
modifying a discontinuous reception cycle value/paging related parameter for the one of the networks, received within the registration request; and
communicating the modified discontinuous reception cycle value/paging related parameter for the one of the networks to the further apparatus within a registration accept message for the one of the networks,
wherein the method further comprises:
receiving, within a registration complete message, a modification of the at least one paging overlap occasion for the one of the networks and the another of the networks associated with the different identities; and
controlling the scheduling of at least one paging message to the further apparatus for the one of the networks based on the modification of the at least one paging overlap occasion such that the at least one paging message for the one of the networks is scheduled at a time other than the modified at least one paging overlap occasion,
wherein control the scheduling of at least one paging message for the one of the networks to the further apparatus based on the modification of the at least one paging overlap occasion further comprises communicating the scheduling of at least one paging message for the one of the networks to the further apparatus based on the modification of the at least one paging overlap occasion within a message to a radio access network node for the network,
wherein communicating the scheduling of at least one paging message for the one of the networks to the further apparatus based on the modification of the at least one paging overlap occasion within a message to a radio access network node for the network further comprises:
communicating the scheduling of at least one paging message for the one of the networks to the further apparatus within a next generation application protocol paging message to the radio access network node; and
communicating the scheduling of at least one paging message for the one of the networks to the further apparatus within a modified context message to the radio access network node,
wherein the at least one paging assistance information element comprises:
a definition of overlapping paging frames;
a system frame number from which the paging overlap window starts;
a paging overlap index identifying a first slot/symbol of the paging overlap; and
a paging overlap length identifying a number of consecutive slot/symbols of the paging overlap,
wherein the identities comprise: a universal subscriber identity module identity; an electronic subscriber identity module identity; and a subscriber identity module identity.

* * * * *